US012786067B1

(12) United States Patent
Wei et al.

(10) Patent No.: US 12,786,067 B1
(45) Date of Patent: Nov. 3, 2026

(54) MESH NETWORK FORMATION AND USE IN A HOME NETWORK FOR CHANNEL STATE INFORMATION (CSI) SENSING

(71) Applicant: Amazon Technologies, Inc., Seattle, WA (US)

(72) Inventors: QingYun Wei, San Jose, CA (US); Avinash Joshi, San Jose, CA (US); Ramesh Radhakrishnan, Chennai (IN); Shiwei Zhao, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 547 days.

(21) Appl. No.: 18/136,219

(22) Filed: Apr. 18, 2023

(51) Int. Cl.
*H04L 41/12* (2022.01)
*H04W 24/10* (2009.01)
*H04W 84/18* (2009.01)

(52) U.S. Cl.
CPC ............ *H04L 41/12* (2013.01); *H04W 24/10* (2013.01); *H04W 84/18* (2013.01)

(58) Field of Classification Search
None
See application file for complete search history.

(56) References Cited

U.S. PATENT DOCUMENTS 10,595,185 B1 * 3/2020 Chen ....................... H04L 5/006
10,979,885 B1 * 4/2021 Shukla ................ H04W 40/246
11,070,945 B1 * 7/2021 Gao ...................... G01S 13/003
11,219,093 B2 * 1/2022 Navalekar ............. H04L 12/189
11,824,961 B1 * 11/2023 Wei ....................... H04L 69/161
12,192,876 B2 * 1/2025 Michielsen ........... H04L 67/565
2008/0062866 A1 * 3/2008 Jiang ..................... H04W 40/24 709/239
2010/0260146 A1 * 10/2010 Lu ....................... H04L 12/4641 455/432.1
2015/0341222 A1 * 11/2015 Mccormack ........... H04W 8/26 370/254
2018/0103404 A1 * 4/2018 Emmanuel ............. H04B 1/005
2021/0014907 A1 * 1/2021 Fraser ...................... H04L 41/12
2021/0099915 A1 * 4/2021 Daniels ................. H04W 84/12
2022/0303218 A1 * 9/2022 Zhodzishsky ......... H04L 47/125
2023/0199610 A1 * 6/2023 Hui ....................... H04W 40/12 370/328
2024/0244448 A1 * 7/2024 Nagendran ......... H04W 36/322
2024/0292472 A1 * 8/2024 Lin ........................ H04W 12/69
2024/0324115 A1 * 9/2024 Su ......................... H04W 84/12
2024/0333445 A1 * 10/2024 Legg .................... H04B 7/0639

* cited by examiner

*Primary Examiner* — Jason D Cardone
(74) *Attorney, Agent, or Firm* — K&L Gates LLP

(57) ABSTRACT

Technologies directed to forming and using a wireless mesh network (e.g., compliant with the IEEE 802.11*s* standard in an existing home wireless network for channel state information (CSI) sensing) are described. One method includes receiving a request to create a wireless local area network (WLAN) mesh network between wireless devices of a home wireless network. The method receives, from the devices, information about a home AP device and the other neighboring devices. The method calculates, using the information, a channel score for available channels for the WLAN mesh network. The method sends commands to the devices to form the WLAN mesh network using a channel having a highest channel score. The method receives, from the devices, channel state information (CSI) data representing channel properties of a mesh link of the WLAN mesh network.

9 Claims, 20 Drawing Sheets

| | Chan 6 | Chan 48 |
|---|---|---|
| Channel base score | 0+(100-40) = 60 | 25+(100-50) = 75 |
| AP-STA Link Score | 8+6 = 14 | 7+9 = 16 |
| Penalty for indirectly connected STA | 0 | 0 |
| **Total Channel Score** | 74 | 91 |

| | Chan 36 | Chan 48 |
|---|---|---|
| Channel base score | 25+(100-40) = 85 | 25+(100-40) = 85 |
| AP-STA Link Score | 5+8+6=19 | 7+9 = 16 |
| Penalty for Indirectly connected STA | 0 | 10 - (avg(9,7)/2) = 10 - 4 = 6 |
| **Total Channel Score** | 85+19-0=**104** | 85+16-6=**95** |

MESH NETWORK FORMATION AND USE IN A HOME NETWORK FOR CHANNEL STATE INFORMATION (CSI) SENSING

BACKGROUND

A large and growing population of users is enjoying entertainment by consuming digital media items, such as music, movies, images, electronic books, etc. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. These electronic devices include one or more antennas to communicate wirelessly with other devices.

A wireless mesh network may support establishing point-to-point wireless links between the participating communication devices. A network device may utilize the wireless mesh network to access digital content stored on one or more digital content servers within or outside the mesh network.

BRIEF DESCRIPTION OF DRAWINGS

The present inventions will be understood more fully from the detailed description given below and from the accompanying drawings of various embodiments of the present invention, which should not be taken to limit the present invention to the specific embodiments but are for explanation and understanding only.

DETAILED DESCRIPTION

Figure 1B:
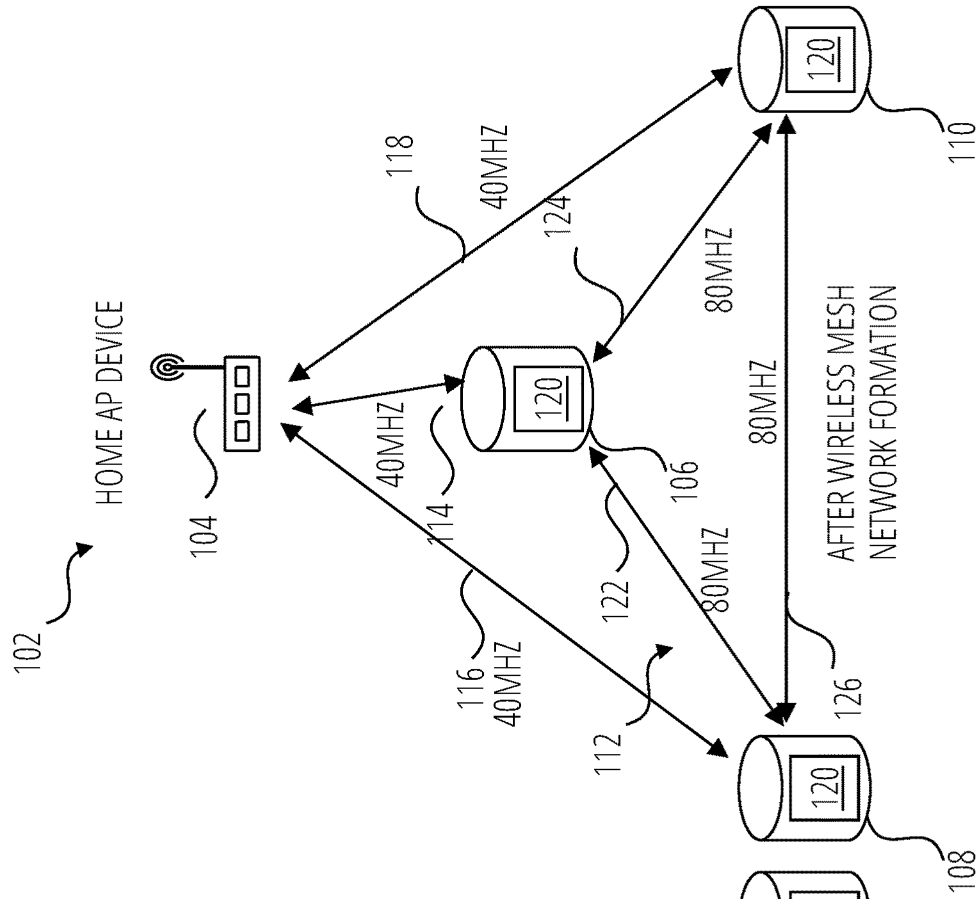
FIG. 1B is a network diagram of a home wireless network with a home AP device, three wireless devices, and a wireless mesh network between the three devices according to at least one embodiment.

Technologies directed to the formation and use of a wireless mesh network (e.g., compliant with the IEEE 802.11s standard and hereinafter referred to as an "802.11s mesh network") in an existing home wireless network for channel state information (CSI) sensing (also referred to as Wi-Fi® sensing) are described. A motion detector (e.g., a wireless detector) is a wireless device that detects moving objects, particularly humans. A motion detector may be integrated as a component of a system that automatically performs a task or alerts a user of motion in an area or vicinity. Accordingly, motion detectors may form a component of security, such as a burglar alarm system, automated lighting control, home control, energy efficiency, and other useful systems.

The presence detection performed by motion detectors may be based on a number of different possible technologies, including, for example, passive infrared (PIR), microwave, ultrasonic, tomographic, video camera software, and gesture detection. A tomographic motion detector may sense disturbances to radio waves that pass from node to node in a mesh network. More generally, wireless radio frequency (RF) signals (or simply "wireless signals") may be employed to not only detect presence within a line of sight, such as in the same room or space, but also the adjacent rooms because wireless signals may pass through walls. These RF signals may be generated via a WLAN employing technology such as 2.4 GHz or 5.0 GHz Wi-Fi®, Bluetooth®, ZigBee®, Zwave® and the like. The use of wireless signals for presence detection may be an attractive option due to the ubiquity of wireless transceivers such as access points (AP) or base station devices in many buildings and homes.

Wireless sensing has gained popularity in recent years due to its pervasiveness, low cost, non-intrusiveness, and privacy preservation, compared to sensor-based and video-based sensing solutions. Specifically, video-based sensing is restricted in line-of-sight (LoS) and light conditions and raises more privacy concerns. Sensor-based sensing incurs extra cost due to additional sensors and an accompanying inconvenience on installation. During the propagation of the wireless signal from the transmitter to the receiver, the wireless signals are affected by obstacles in the transmission space, resulting in attenuation, refraction, diffraction, reflection, etc. Therefore, wireless signals arrived at the receiver carry the environmental information, which can be extracted by applying unique signal processing techniques and machine learning algorithms. Wi-Fi® sensing enables use cases such as presence detection and localization, human activity recognition, gesture recognition, and indoor tracking.

Furthermore, the RF channel properties available through radio transmission channels may contain data that may be employed in machine learning techniques used to train, for example, a supervised machine learning (ML) model for presence classification. Examples of data that may carry RF channel properties include RSSI data, CSI data, or a combination of both, as will be discussed in more detail. Additional sources of signal characteristics, power, channel properties, or other channel information may also be employed, and therefore, RSSI and CSI are but a listing of understood and available forms of channel properties. RSSI is a measurement value of power present in received wireless signals and contains a single value per packet. For example, RSSI can be measured as the power level of a radio frequency that a client device receives from an access point, such as a wireless router. RSSI may be a measurement of the energy observed at the antenna by a wireless physical layer (PHY) of the receiver used to receive a current Physical Layer Convergence Protocol (PLCP) Protocol Data Unit (PPDU) of the receiver. In a typical home WLAN, the client device generates the RSSI based on the data frame received or the beacon from the AP. The RSSI fluctuates when the environment changes. Such changes can be caused by many factors: moving transmitter or receiver, moving objects nearby the AP or client, changing ambient noise level, etc. Unlike the RSSI, which is a single value available per packet, the CSI includes the detailed channel impulse response with amplitude and phase information across all the Orthogonal frequency-division multiplexing (OFDM) subcarriers and is updated (at the maximum rate) every OFDM symbol. This provides more information about the environment under surveillance. Therefore, by the use of CSI, better detection can be accomplished. For example, a CSI signal can distinguish whether a person is watching television (TV) or washing dishes. However, RSSI based method is not able to distinguish them.

CSI data is granular, real-time data on the amplitude and phase of each channel subcarrier between the WLAN transmitter and receiver. Raw CSI data, provided by the chipset, is fed to a signal processing engine for noise reduction, signal transforms, and/or signal extraction. The current implementations take these processed CSI data and run it through an ML model to determine whether the environment has been disrupted to the point of perceiving motion. This ML model can be "tuned" to prioritize latency, accuracy/sensitivity using hysteresis or by applying a user-provided threshold for notification.

CSI-based motion detectors do not require an "active transmitter" like a phone to be on a person to detect and track them. Rather, CSI-based motion detectors work based on disruption to the channel state information and the multipath effects of WLAN transmission between AP devices, smart speakers, streaming devices, etc.

To conduct Wi-Fi® sensing, wireless devices need to retrieve the per-frame channel state information (CSI) from the WLAN chipset. CSI is the channel properties of a communication link. This information describes how a signal propagates from the transmitter to the receiver and represents the combined effect of, for example, scattering, fading, and power decay with distance. So by monitoring the variation of each frame's CSI, some environmental changes and human behaviors like object motion, people presence, and even breadth rate can be detected. Ideally, the CSI needs to be collected over high-bandwidth channels (e.g., greater than 40 MHz) from multiple peer nodes to conduct highly accurate sensing. Some client devices in a home wireless network have a single wireless link connecting to the home AP device. Some AP devices do not enable 80 MHz bandwidth. So relying on the traditional home network topology, it is difficult to implement accurate Wi-Fi® sensing on some client devices, even if the user has multiple wireless devices throughout the home.

Aspects of the present disclosure address the above and other deficiencies by providing technology to form and use an 802.11s mesh network between wireless devices of a home wireless network for CSI sensing while the wireless devices maintain the connection with a home AP device for WLAN or Internet access. The wireless devices can form an internal 802.11s mesh network while still maintaining the connection to the home AP device using an 802.11s/station (STA) concurrent mode. In this mode, each wireless device (also called a mesh node) can establish multiple mesh links with other wireless devices (other mesh nodes in the mesh network). All the links within the mesh network can be used for CSI sensing. Even if the home AP device does not support the 80 MHz bandwidth or higher (e.g., 160 MHz, 320 MHz, or the like), the internal mesh network can still enable 80 MHz bandwidth over the mesh links to provide high-quality CSI data. Thus, compared with the traditional home AP-based star topology, the coverage, robustness, and accuracy of the Wi-Fi® sensing system would greatly improve with the Wi-Fi® mesh network due to the abundance of CSI data across the home. The Wi-Fi® sensing can facilitate many smart CSI-sensing applications.

Aspects of the present disclosure address the above and other deficiencies by forming an internal 802.11s mesh network among devices on the same home network and providing a multi-link, low-latency, and high-bandwidth WLAN topology to support Wi-Fi® sensing. The embodiments can extend the usage of the 802.11s stack to support more projects, including Wi-Fi® sensing that is independent of the AP devices or AP routers. With the 802.11s/STA concurrent mode, wireless devices can still connect to the home AP to access the Internet and local area network (LAN). The internal 802.11s network can provide multiple low-latency and high-bandwidth peer-to-peer links to support high sensing accuracy and direct device-to-device communication. If some devices are far away from the home AP device, the devices can join the mesh network to leverage other devices to access the Internet and LAN. The technical details of the mesh channel selection, group forming, and data-path establishment are described herein.

Figure 1A:
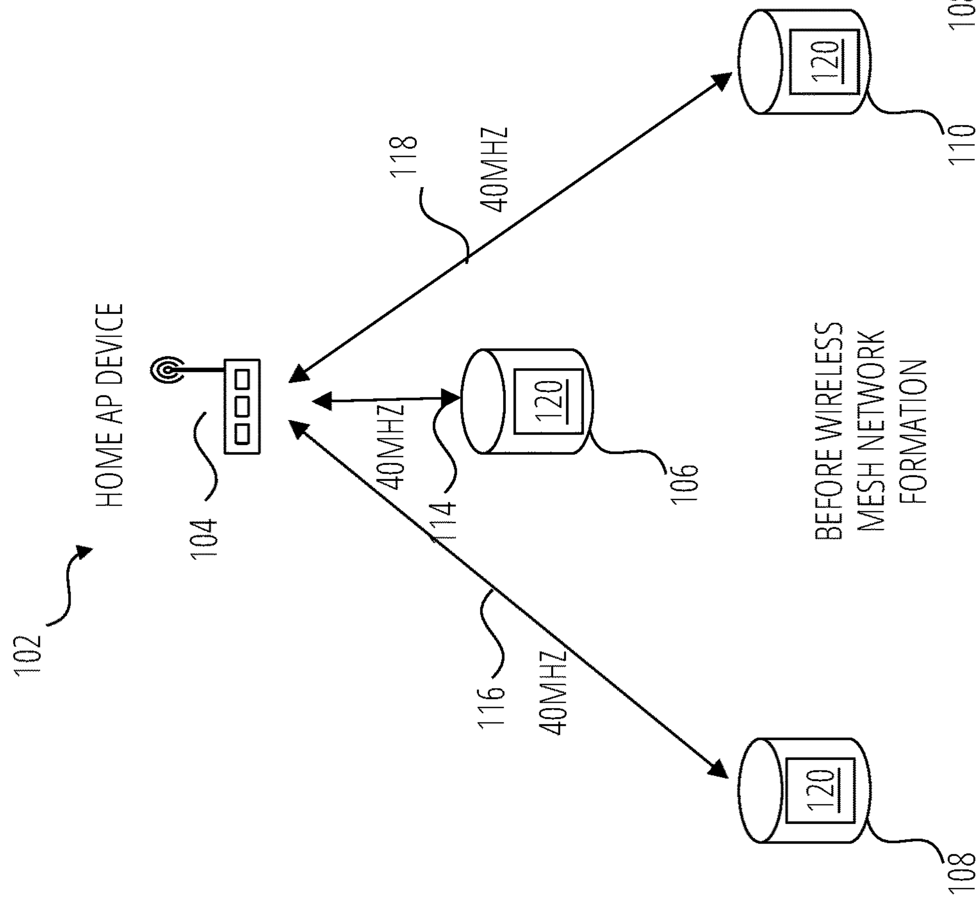
FIG. 1A is a network diagram of a home wireless network with a home AP device 104 and three wireless devices before establishing a wireless mesh network according to at least one embodiment.

FIG. 1A is a network diagram of a home wireless network 102 with a home AP device 104 and three wireless devices 106, 108, 110 before establishing a wireless mesh network 112 (in FIG. 1B) according to at least one embodiment. The home wireless network 102 can be a wireless local area network (WLAN). The home wireless network 102 can include multiple devices, including a home access point (AP) device 104, and a wireless device 106, a wireless device 108, a wireless device 110. The wireless devices 106, 108, 110 can be endpoint devices (referred to herein as client devices, stations (STAs). The wireless devices 106, 108, 110 can each be a computer, a smartphone, a voice-controlled device, a wireless display, a wireless speaker, a game console, a wireless gamepad, a thermostat, a smart home device, or the like. The home wireless network 102 can include additional home AP devices (not illustrated in FIG. 1A). The home AP device 104 can provide backhaul connectivity to a gateway, a modem, or a router, such as using a wired or wireless connection to the Internet or other devices of the home wireless network 102 (not illustrated in FIG. 1A). Alternatively, the home AP device 104 can be a gateway, a modem, or a router in the home wireless network 102. The home AP device 104 can provide internet access to wireless devices 106, 108, 110. In another embodiment, other AP devices can provide Internet access.

In particular, the wireless device 106 can establish a wireless link 114 (also referred to as a wireless connection) with the home AP device 104. The wireless device 108 can establish a wireless link 116 with the home AP device 104. The wireless device 110 can establish a wireless link 118 with the home AP device 104. In at least one embodiment, a primary radio of the home AP device 104 can be used to connect to another AP device, gateway, router, or the like, and a secondary radio to create the wireless links 114, 116, 118, with the wireless devices 106, 108, 110. Both radios can operate in the same band or separate bands. Alternatively, a single radio can be used for both types of wireless connections. Alternatively, home wireless network 102 can include more or fewer devices, as illustrated in FIG. 1A.

As illustrated in FIG. 1A, the wireless device 106 can establish the wireless link 114 with the home AP device 104 at 40 MHz. Similarly, the wireless device 108 can establish the wireless link 116 with the home AP device 104 at 40 MHz, and the wireless device 110 can establish the wireless link 118 at 40 MHz. FIG. 1A illustrates the home wireless network 102 before the wireless mesh network 112 is formed. As illustrated in FIGURE, the wireless device 106 can include mesh network logic 120 to form and use the wireless mesh network 112 for CSI sensing in an 802.11s/STA concurrent mode. 1B.

FIG. 1B is a network diagram of a home wireless network 102 with a home AP device 104 and three wireless devices 106, 108, 110, and a wireless mesh network 112 between the three wireless devices 106, 108, 110 according to at least one embodiment. Using the mesh network logic 120, the wireless device 106 can establish a mesh link 122 with the wireless device 108 and a mesh link 124 with the wireless device 110. The wireless device 108 (or the wireless device 110) can establish a mesh link 126 with the other device using mesh network logic 120 at the respective wireless device. The mesh links 122, 124, and 126 can operate at 80 MHz. The wireless devices 106, 108, 110 can share CSI data with a centralized controller for CSI sensing. The centralized controller can be one of the devices in the home wireless network 102. Alternatively, the centralized controller can be a remote device, such as a computing device that is part of a cloud computing system. Using the internal wireless mesh network 112 among the wireless devices 106, 108, and 110, the Wi-Fi® sensing with high accuracy becomes possible with the same home wireless network 102 without requiring a user to upgrade or reconfigure the home AP device 104 to support 80 MHz.

Figure 2B:
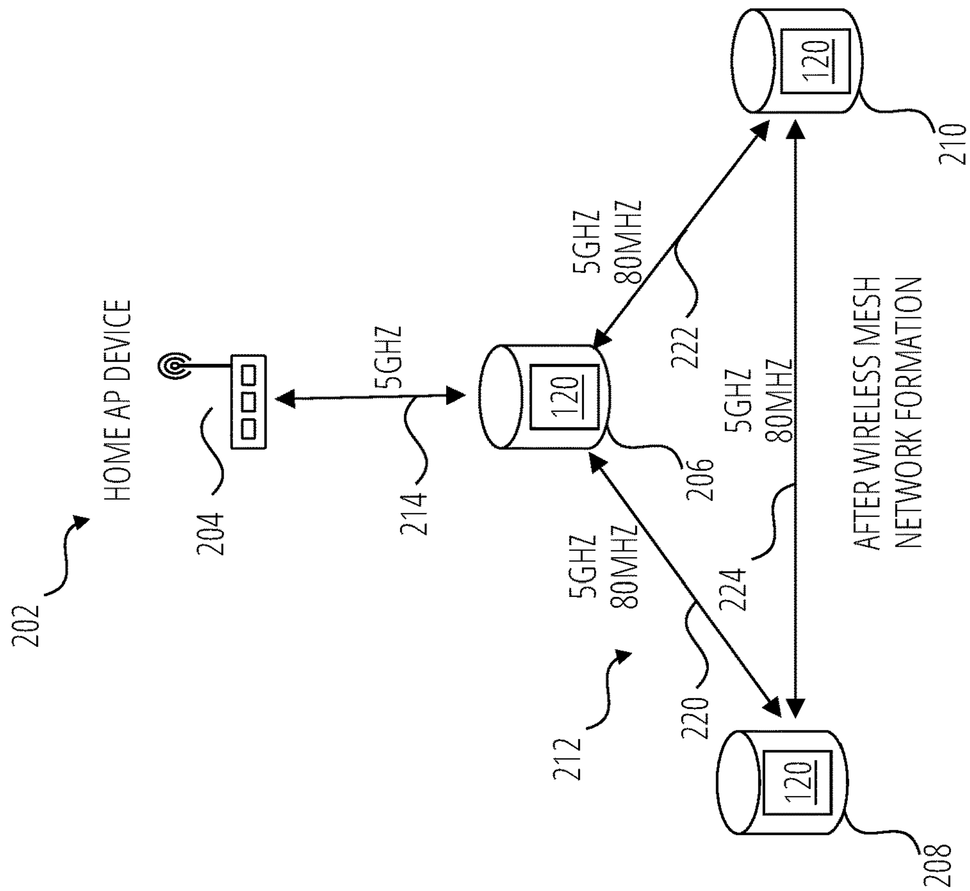
FIG. 2B is a network diagram of a home wireless network with a home AP device, three wireless devices, and a wireless mesh network between the three devices according to at least one embodiment.
Figure 2A:
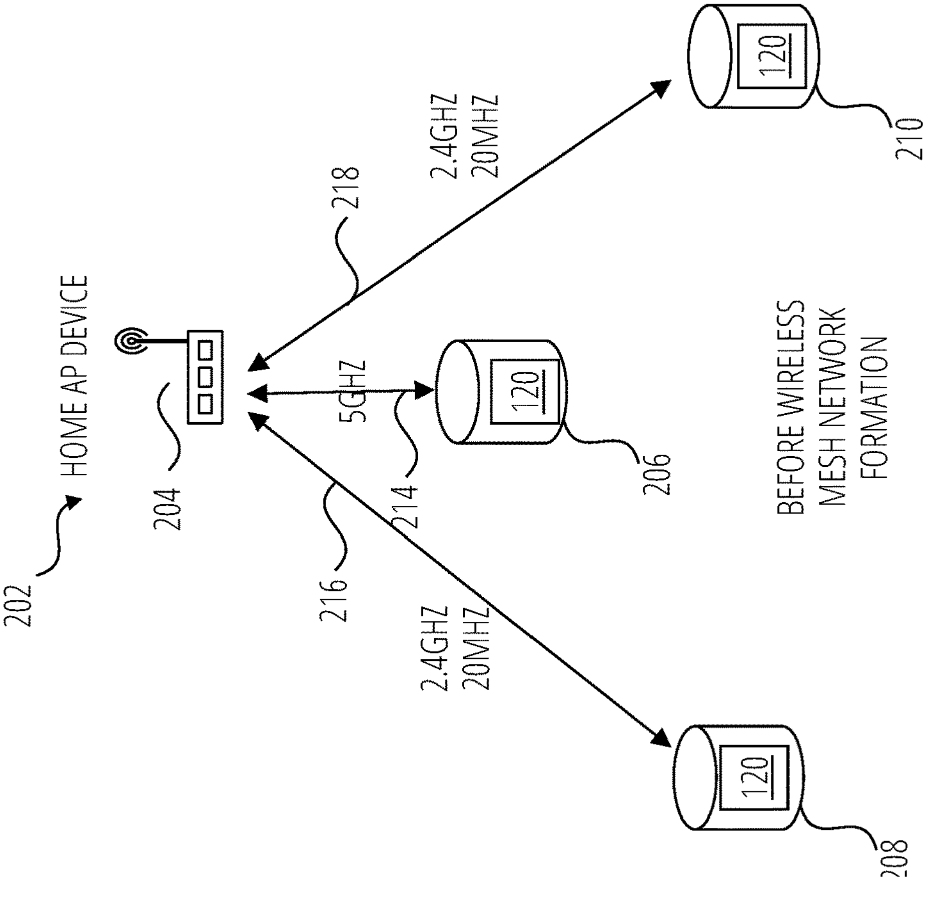
FIG. 2A is a network diagram of a home wireless network with a home AP device and three wireless devices before establishing a wireless mesh network according to at least one embodiment.

FIG. 2A is a network diagram of a home wireless network 202 with a home AP device 204 and three wireless devices 206, 208, 210 before establishing a wireless mesh network 212 according to at least one embodiment. The home wireless network 202 is similar to the home wireless network 102, but in this scenario illustrated in FIG. 2A, only one device, wireless device 206, can connect to the home AP device 204 on a wireless link 214 at 5 GHz. The wireless device 208 can connect to the home AP device 204 on a wireless link 216 at 2.4 GHz with 20 MHz bandwidth. The wireless device 210 can connect to the home AP device 204 on a wireless link 218 at 2.4 GHz with 20 MHz bandwidth. The wireless device 208 and wireless device 210 may connect using 2.4 GHz due to range issues. The CSI sensing may not be feasible because of the bandwidth limitation on the 2.4 GHz (e.g., 20 MHz).

FIG. 2A illustrates the home wireless network 202 before the wireless mesh network 212 is formed. The wireless device 206 can include mesh network logic 120 to form and use the wireless mesh network 212 for CSI sensing in an 802.11s/STA concurrent mode, as illustrated in FIG. 2B.

FIG. 2B is a network diagram of a home wireless network 202 with a home AP device 204 and three wireless devices 206, 208, 210, and a wireless mesh network 212 between the three wireless devices 206, 208, 210 according to at least one embodiment. As described above, CSI sensing may not be feasible without the wireless mesh network 212 because of the bandwidth limitation on the 2.4 GHz frequency band. But with the wireless mesh network 212, the wireless device 208 and wireless device 210 can switch to the wireless mesh network 212 on the 5 GHz and leverage the wireless device 206 for LAN/Internet access. The details of how to leverage the wireless device 206 are described in more detail below. With the wireless mesh network 212, the CSI sensing can be enabled with mesh links operating at 80 MHz bandwidth. In particular, using the mesh network logic 120, the wireless device 206 can establish a mesh link 220 with the wireless device 208 and a mesh link 222 with the wireless device 210. The wireless device 208 or the wireless device 210 can establish a mesh link 224 with the other device using mesh network logic 120 at the respective wireless device. The mesh links 220, 222, and 224 can operate at 80 MHz. The wireless devices 206, 208, 210 can share CSI data with a centralized controller for CSI sensing. The centralized controller can be one of the devices in the home wireless network 202. Alternatively, the centralized controller can be a remote device, such as a computing device that is part of a cloud computing system. Using the internal wireless mesh network 212 among the wireless devices 206, 208, and 210, the Wi-Fi® sensing with high accuracy becomes possible with the same home wireless network 202 without requiring a user to upgrade or reconfigure the home AP device 204 to support 80 MHz.

Figure 3B:
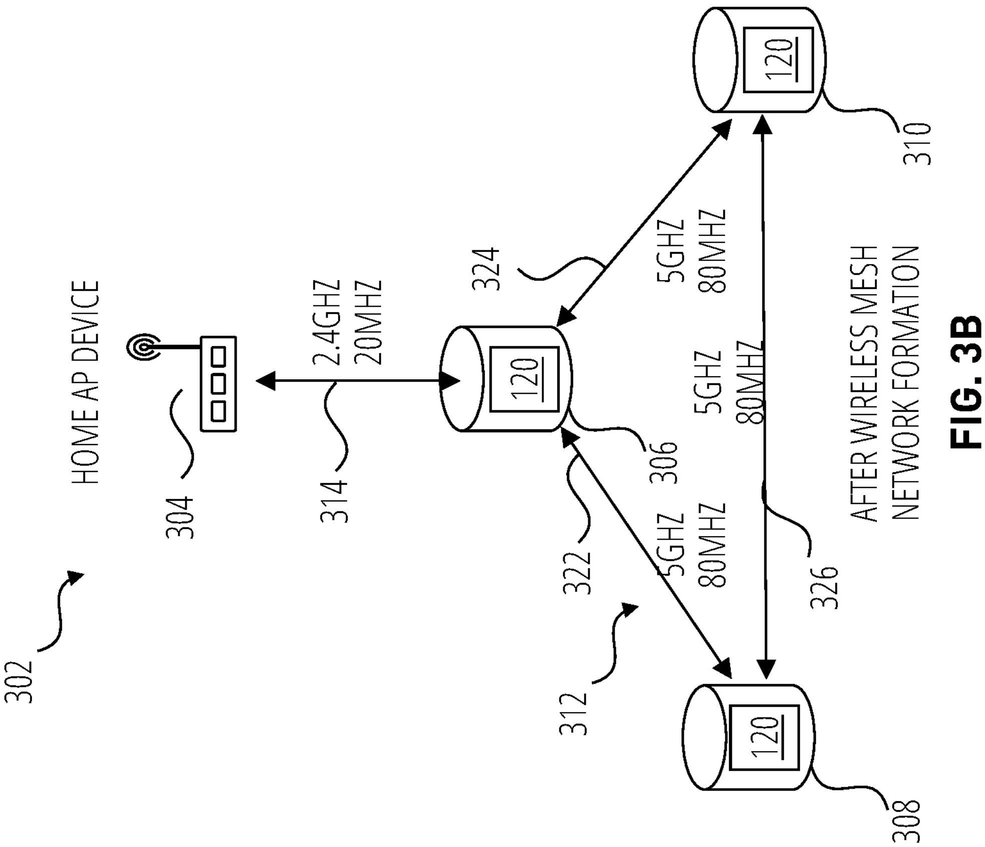
FIG. 3B is a network diagram of a home wireless network with a home AP device, three wireless devices, and a wireless mesh network between the three devices according to at least one embodiment.
Figure 3A:
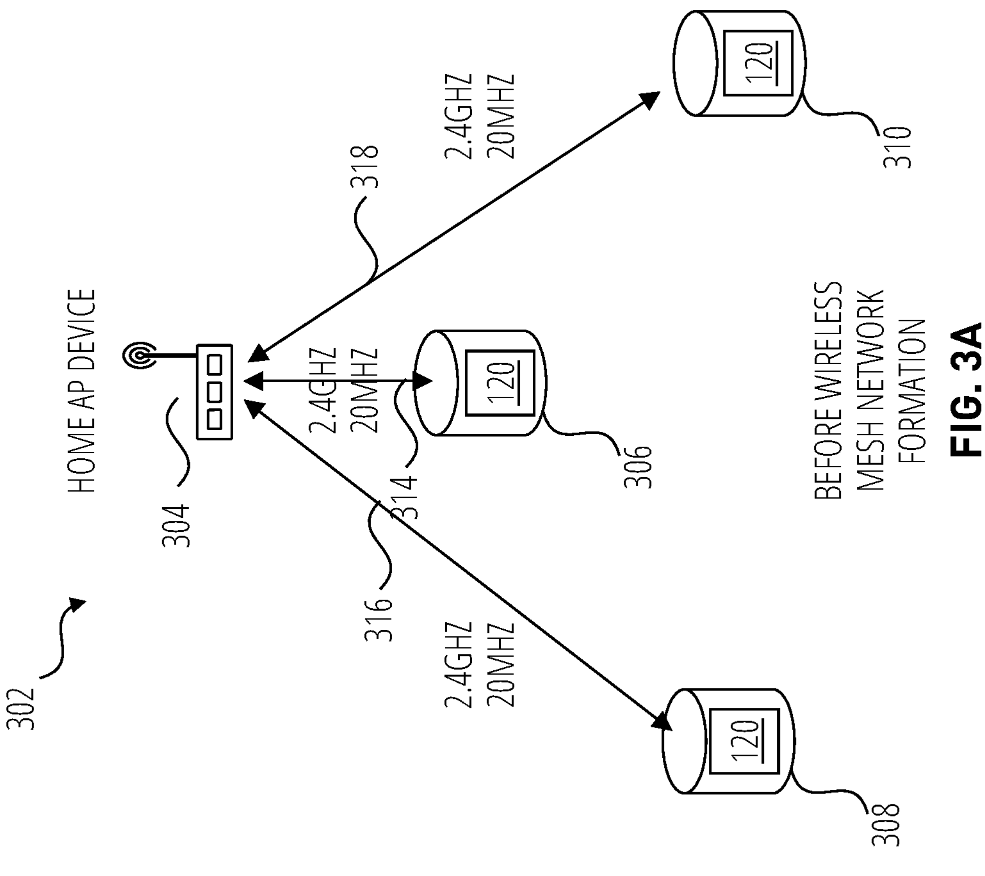
FIG. 3A is a network diagram of a home wireless network with a home AP device and three wireless devices before establishing a wireless mesh network according to at least one embodiment.

FIG. 3A is a network diagram of a home wireless network 302 with a home AP device 304 and three wireless devices 306, 308, 310 before establishing a wireless mesh network according to at least one embodiment. The home wireless network 302 is similar to the home wireless network 302, but in this scenario illustrated in FIG. 3A, all devices are connected to the home AP device 304 at 2.4 GHz. In particular, the wireless device 306 can connect to the home AP device 304 on a wireless link 314 at 2.4 GHz with 20 MHz bandwidth. The wireless device 308 can connect to the home AP device 304 on a wireless link 316 at 2.4 GHz with 20 MHz bandwidth. The wireless device 310 can connect to the home AP device 304 on a wireless link 318 at 2.4 GHz with 20 MHz bandwidth. Due to range issues, the wireless devices 206, 208, and 210 may connect using 2.4 GHz. The CSI sensing may not be feasible because of the bandwidth limitation on the 2.4 GHz (e.g., 20 MHz).

FIG. 3A illustrates the home wireless network 302 before the wireless mesh network 312 is formed. The wireless device 306 can include mesh network logic 120 to form and use the wireless mesh network 312 for CSI sensing in an 802.11s/STA concurrent mode, as illustrated in FIG. 3B. In particular, the wireless device 306 can support Dual Band Dual Concurrence (DBDC) mode to create an internal wireless mesh network 312 on the 5 GHz frequency band and maintain the home AP connection on the 2.4 GHz. The wireless device 308 and 310 can use the home AP connection of the wireless device 306 on the 2.4 GHz frequency band to access LAN/Internet.

FIG. 3B is a network diagram of a home wireless network 302 with a home AP device 304 and three wireless devices 306, 308, 310, and a wireless mesh network 312 between the three wireless devices 306, 308, 310 according to at least one embodiment. As described above, CSI sensing may not be feasible without the wireless mesh network 312 because of the bandwidth limitation on the 2.4 GHz frequency band. But with the wireless mesh network 312, the wireless device 308 and wireless device 310 can switch to the wireless mesh network 312 on the 5 GHz and leverage the wireless device 306 for LAN/Internet access. The details of how to leverage the wireless device 306 are described in more detail below. With the wireless mesh network 312, the CSI sensing can be enabled with mesh links operating at 80 MHz bandwidth. In particular, using the mesh network logic 120, the wireless device 306 can establish a mesh link 322 with the wireless device 308 and a mesh link 324 with the wireless device 310. The wireless device 308 or the wireless device 310 can establish a mesh link 326 with the other device using mesh network logic 120 at the respective wireless device. The mesh links 322, 324, 326 can operate at 80 MHz. The wireless devices 306, 308, 310 can share CSI data with a centralized controller for CSI sensing. The centralized controller can be one of the devices in the home wireless network 302. Alternatively, the centralized controller can be a remote device, such as a computing device that is part of a cloud computing system. Using the internal wireless mesh network 312 among the wireless devices 306, 308, and 310, the Wi-Fi® sensing with high accuracy becomes possible with the same home wireless network 302 without requiring a user to upgrade or reconfigure the home AP device 304 to support 80 MHz.

Figure 4B:
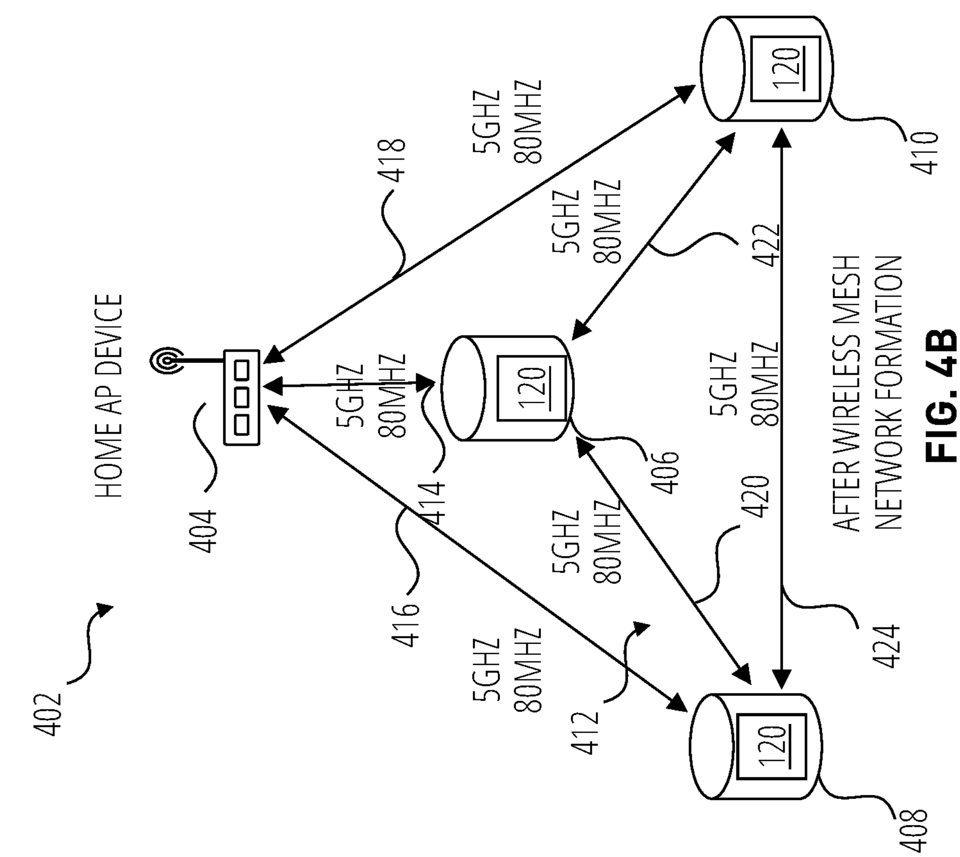
FIG. 4B is a network diagram of a home wireless network with a home AP device, three wireless devices, and a wireless mesh network between the three devices according to at least one embodiment.
Figure 4A:
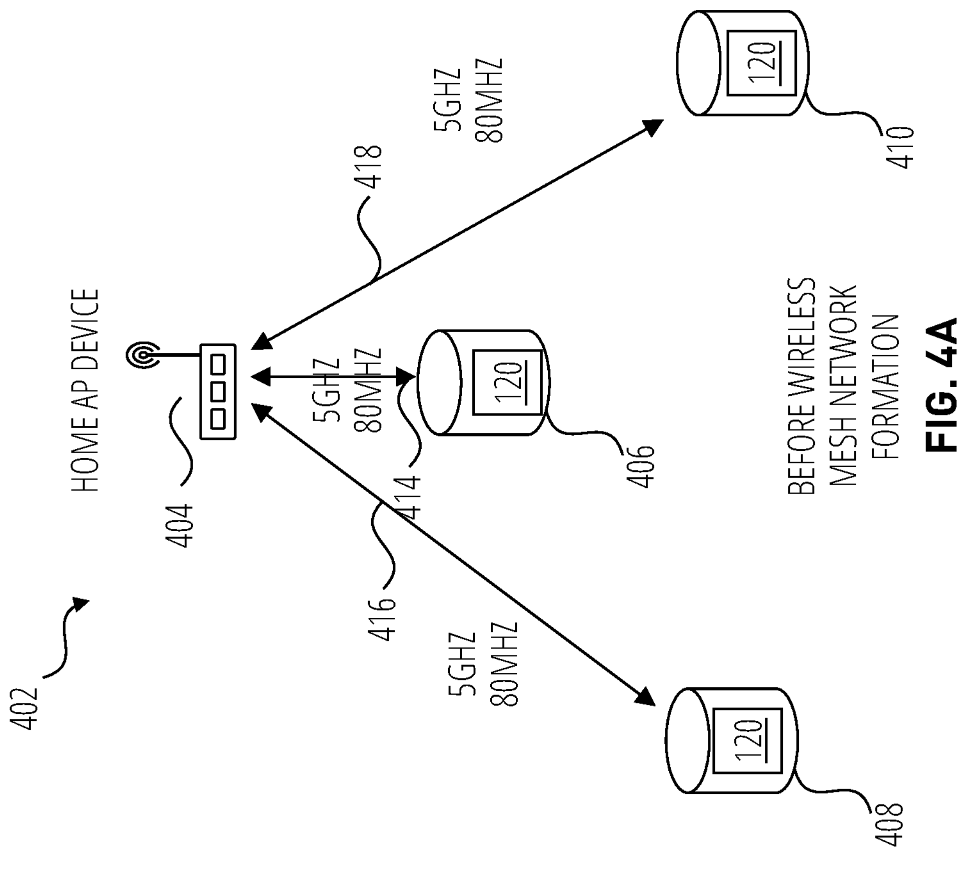
FIG. 4A is a network diagram of a home wireless network with a home AP device and three wireless devices before establishing a wireless mesh network according to at least one embodiment.

FIG. 4A is a network diagram of a home wireless network 402 with a home AP device 404 and three wireless devices 406, 408, 410 before establishing a wireless mesh network 412 according to at least one embodiment. The home wireless network 402 is similar to the home wireless network 302, but in this scenario illustrated in FIG. 4A, all devices are connected to the home AP device 404 at 5 GHz and can support 80 MHz. In particular, the wireless device 406 can connect to the home AP device 404 on a wireless link 414 at 5 GHz with 80 MHz bandwidth. The wireless device 408 can connect to the home AP device 404 on a wireless link 416 at 5 GHz with 80 MHz bandwidth. The wireless device 410 can connect to the home AP device 404 on a wireless link 418 at 5 GHz with 80 MHz bandwidth.

FIG. 4A illustrates the home wireless network 402 before the wireless mesh network 412 is formed. The wireless device 406 can include mesh network logic 120 to form and use the wireless mesh network 412 to further enhance the CSI sensing in an 802.11s/STA concurrent mode, as illustrated in FIG. 4B. Even though CSI sensing is feasible, the wireless mesh network 412 can provide additional value. Because each node has a single link to the home AP device, the information obtained from CSI over the link is still limited. And the CSI from some chipsets may not be consistent. With the additional links in the wireless mesh network 412, those limitations could be mitigated by the rich CSI information. That could significantly improve the accuracy of CSI sensing.

FIG. 4B is a network diagram of a home wireless network 402 with a home AP device 404 and three wireless devices 406, 408, 410, and a wireless mesh network 412 between the three wireless devices 406, 408, 410 according to at least one embodiment. In addition to maintaining its connection with the home AP device 404, the wireless device 406, the wireless device 408, and the wireless device 410 can establish a mesh link in the wireless mesh network 412. With the wireless mesh network 412, the CSI sensing can be further enhanced with mesh links operating at 80 MHz bandwidth. In particular, using the mesh network logic 120, the wireless device 406 can establish a mesh link 420 with the wireless device 408 and a mesh link 422 with the wireless device 410. The wireless device 408 or the wireless device 410 can establish a mesh link 424 with the other device using mesh network logic 120 at the respective wireless device. The mesh links 420, 422, 424 can operate at 80 MHz. The wireless devices 406, 408, 410 (and home AP device 404) can share CSI data with a centralized controller for CSI sensing. The centralized controller can be one of the devices in the home wireless network 302. Alternatively, the centralized controller can be a remote device, such as a computing device that is part of a cloud computing system. Using the internal wireless mesh network 412 among the wireless devices 406, 408, and 410 (and the CSI data from the wireless links 416, 418), the Wi-Fi® sensing with high accuracy becomes possible with the same home wireless network 402 without requiring a user to upgrade or reconfigure the home AP device 404 to support 80 MHz. It should be noted that the detection rate of human presence detection increases with the number of links that support CSI sensing increase, providing better accuracy in sensing.

It should be noted that mesh-enabled AP routers can have two options to create the backbone mesh links, including wireless distribution system (WDS) and 802.11s protocol. The embodiments described herein are directed to mesh networks created by wireless devices that are not necessarily AP routers using the 802.11s protocol. The WDS can only create a mesh with a limited number of links in a tree-style network and requires an external algorithm to decide how to form the tree topology among the mesh nodes. The IEEE 802.11s standard has a WLAN media access control (MAC) layer mesh protocol using a 6-address frame format. Unlike tree-based WDS, the 802.11s protocol establishes a full mesh topology with the built-in self-forming method and route discovery protocol. One of the differences between tree-based and full-mesh topology is the number of links among network nodes. Among the n nodes, the tree-based network can only have m−1 (O(n)) links, and the full-mesh structure can have mesh links up to n(n−1)/2 (O(n2)). Such extra links provided by 802.11s full-mesh topology could be especially desirable to the use case of Wi-Fi® sensing. Most of the mesh AP routers in the market are using WDS. Some AP mesh routers are based on 802.11s and can enable a softAP concurrent mode on some selected products. Those devices can join the 802.11s backbone mesh network created by an AP device and create soft AP interfaces to run as a satellite mesh AP node to provide access to other client devices. As described herein, besides the backbone mesh network created by AP routers, the client devices can also create a client-domain mesh network using the 802.11s protocol. Unlike the 802.11s and softAP concurrent mode used by some devices, the wireless devices, using the mesh network logic 120, can enable the 802.11s/STA concurrent mode to form an internal full-mesh network and still connect to home AP at the same time. Through peer-to-peer mesh links, the wireless devices can be mesh nodes that can directly communicate with one another without relying on a home AP device. The internal mesh network can be leveraged for Wi-Fi® sensing to support motion/presence detection and other usages. When a device cannot connect to its home AP device for some reason, it can leverage other nodes to recover the network access through the internal mesh network, as described in more detail below.

Mesh Channel Selection and Group Forming

To maintain the 802.11s and STA concurrent mode, the assumption is all of the mesh nodes need to connect to the home AP devices at the same Wi-Fi channel, then the internal mesh network can be created at the same channel, which is the Single Channel Concurrent (SCC) mode requirement. Initially, different nodes may connect to different home AP devices at different channels. The nodes have to conduct a group AP/channel selection to decide which channel they should move to create the internal mesh. In at least one embodiment, the elected channel meets the following requirements: All or most nodes can connect to home AP devices at the channel with an acceptable RSSI (e.g., RSSI values satisfy a threshold criterion). The mesh nodes can form a connected graph in topology, which means there is always a path from any node to any other nodes in the mesh network. The formed graph topology should have more direct mesh links, as many as possible.

In at least one embodiment, to form the internal mesh among a group of wireless devices that have been already connected to the home AP device, those devices will conduct the following steps to select which channel they should operate on: (1) User initiates the mesh group forming through some user interface (UX) of a cloud-based application programming interface (API). The selected devices can be commanded to start the mesh forming using the following parameters: a mesh ID, a device identifier (ID) (e.g., MAC addresses or other device identifiers) in the group, and a targeted home AP service set identifier (SSID). Since the devices could connect to different home AP devices with different SSIDs initially, it can be up to a cloud-based policy to decide whether the devices shall connect to the same single SSID or not while forming the mesh network. (2) Each device can conduct a full channel scan to discover other devices in the group. For example, in a probe request, a special mesh discovery informational element (IE) can be inserted to identify a transaction of mesh forming. The IE can contain the mesh ID, a mesh neighbor report (MNR), and a target AP report (TAR). Example data structures of the TAR and MNR are shown below in Table 1 and Table 2.

TABLE 1

| Node MAC | AP BSSID | RSSI | Band | Channel | Clear Channel Assessment (CCA) @node | Connected? | Rx Timestamp |
|---|---|---|---|---|---|---|---|
| b0:fc:0d:5c:40:11 | cc:40:d0:7a:82:11 | −38 | 5G | 36 | 45 | YES | 1931602050 |
| b0:fc:0d:5c:40:11 | cc:40:d0:7a:82:22 | −45 | 5G | 44 | 50 | NO | 1931802050 |

TABLE 2

| Node MAC | Neighbor MAC | RSSI | Band/Channel where found | Link Cost | Rx Timestamp |
|---|---|---|---|---|---|
| b0:fc:0d:5c:40:11 | b0:fc:0d:5c:40:22 | −60 | 5G/44 | 20 | 1931802050 |
| b0:fc:0d:5c:40:11 | b0:fc:0d:5c:40:33 | −70 | 5G/44 | 40 | 1931802050 |

After receiving a probe request with the special mesh discovery IE, each node in the mesh group can reply with a probe response with mesh discovery IE that has the mesh ID and current version of MNR/TAR discovered by the responder. In at least one embodiment, the MNR is a table built by each node. Every mesh node is an entry in the table. (3) The entry can contain the attributes like RSSI, a channel number, and a connected SSID. Each mesh node can generate a TAR, which is a table that lists each discovered target AP SSID's RSSI and channel. By combining the MNR and TAR from all of the mesh nodes, an algorithm can be executed on a centralized controller (e.g., one of the devices in the mesh network, such as a leaf node or a cloud controller) to decide which channel the nodes shall move to create the 802.11s network and connect to the target home AP devices. The centralized controller can generate the random 802.11s credentials (e.g., mesh ID and security key) for the devices in the mesh network. The details regarding the proposed algorithm for channel selection and mesh forming are described in more detail below.

Mesh Data Path

After the mesh network is formed, there are two possible device types depending on whether the nodes can connect to the home AP device, including Type 1 and Type 2. Type 1 devices are nodes that can connect to a home AP device and join the mesh simultaneously. This Type-1 node has two Wi-Fi® interfaces, one in client STA mode and another in 802.11s mesh mode. Such Type-1 nodes can run as mesh gateways for Type-2 devices. Type 2 devices are the nodes that cannot connect to any home AP device because of range issues. Such nodes have an active mesh interface after joining the mesh network. Over the mesh interface, Type-2 nodes can establish an Ethernet-over-internet protocol (IP) tunnel over the mesh interface with another Type-1 gateway node with a home AP connection. The Type-1 node (gateway node) can provide Internet and LAN access for Type-2 nodes through the tunnel. All mesh nodes can generate auto-configured internet protocol (IP) addresses for their mesh network interfaces. As such, the mesh interface can have only link-local IP addresses. For IPv4, it is from address block 169.254.0.0/16 (169.254.0.0 through 169.254.255.255) following RFC 3927. For IPv6, it has the fe80::/64 prefix following RFC 4291. Each node will follow the standards to conduct duplicate address detection (DAD) to generate the unique IPv4 and IPv6 link-local addresses for the mesh interfaces. After that, the nodes can use multicast DNS (mDNS) over the mesh interface to discover other peer nodes' IPv4/IPv6 addresses. After the mesh is formed, the upper-layer Wi-Fi® sensing application can attach to the mesh interface for receiving per-frame CSI and low-latency peer-to-peer communication.

Figure 5:
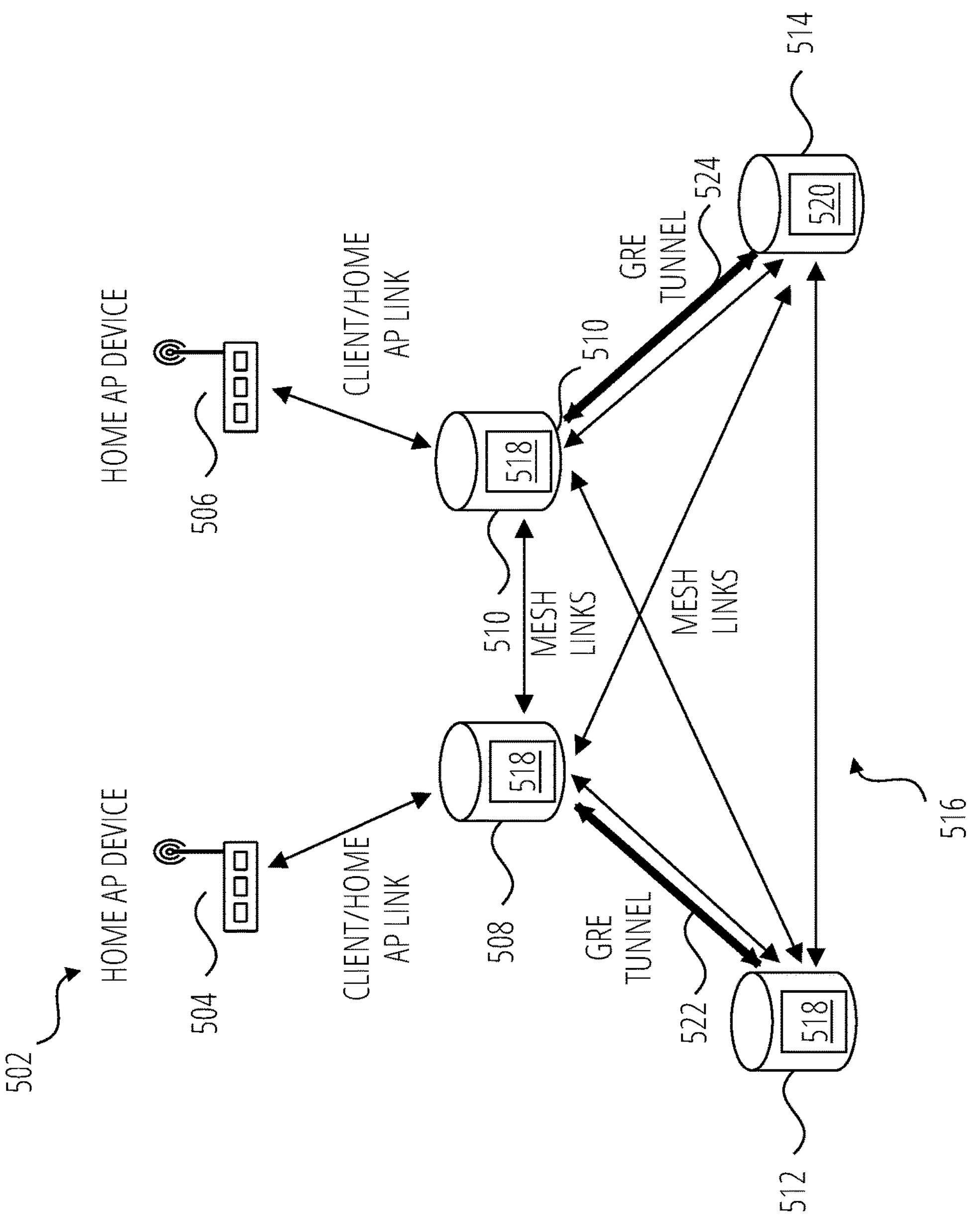
FIG. 5 is a network diagram of a home wireless network with multiple home AP devices, and multiple wireless devices, some having GRE tunnels via a wireless mesh network to the home AP devices, according to at least one embodiment.

On the Type-1 nodes, normal IP provisioning methods, like Dynamic Host Configuration Protocol (DHCP) and Stateless Address Auto Configuration (SLAAC), can be used to obtain IPv4/IPv6 addresses and other settings (default gateway and DNS servers) for the client STA interface. On a Type-2 node, after joining the mesh network, a Type-1 node can be selected as the gateway. The Type-2 nodes need to run the gateway selection algorithm designed to calculate the routing scores between the Type-2 node and all of the Type-1 nodes. The Type-2 node can decide which Type-1 node will be its gateway according to each Type-1 node's routing score, along with the costs of the links between the Type-1 devices and their home AP devices. Then the Type-2 device can establish an ethernet-over-IP tunnel with the selected Type-1 gateway node using Generic Routing Encapsulation (GRE) tap interface (a GRE tunnel interface), such as illustrated in FIG. 5. GRE is a protocol for encapsulating data packets that use one routing protocol inside the packets of another protocol. In other embodiments, other Ethernet-over-IP tunneling methods can be used.

FIG. 5 is a network diagram of a home wireless network 502 with multiple home AP devices 504, 506, and multiple wireless devices 508, 510, 512, 514, some having GRE tunnels via a wireless mesh network 516 to the home AP devices 504, 506, according to at least one embodiment. The topology of the 516 includes both Type-1 and Type-2 nodes. In particular, wireless device 508 and wireless device 510 can directly connect to home AP devices home AP device 504, 506, respectively, so they are Type-1 devices. The wireless device 512 and wireless device 514 could be far away from home AP devices 504, 506, and therefore are Type-2 devices that need to establish ethernet-over-IP tunnels 522, 524 (labeled GRE tunnels) to wireless device 508 and wireless device 510, respectively, to access Internet/LAN.

Technically, it is possible to enable a Type-2 device to be a gateway to provide Internet access for downstream devices. A Type-2 device can establish an ethernet-over-IP tunnel with the selected Type-1 gateway node using a GRE tunnel interface. A Type-1 gateway can bridge the GRE tunnel interface with its Wi-Fi STA interface using a BridgeD daemon. After that, the Type-2 device can launch a DHCP client over the GRE tunnel interface to obtain an IPv4 address from the home AP router. IPv6 can be provisioned through the tunnel interface. To simplify the design, Type-2 nodes can be disallowed from being gateway devices and limit the overlay GRE tunnel to having only one hop. Because a switching loop can be created between the home network and the internal mesh network, the STA and mesh interface should not be bridged on Type-1 gateway devices. Using the ethernet-over-IP tunnel approach, a tree-based overlay structure can be created on top of the internal mesh network, making bridging the Type-2 nodes possible.

In another embodiment, to maintain the 802.11s and STA concurrent mode, the mesh nodes can use multiple radios (e.g., DBDC mode) to connect to the home AP devices on different channels instead of a single channel in the SCC mode. In some embodiments, the mesh network logic 120 creates the wireless mesh network using the 5 GHz frequency band while avoiding the 2.4 GHz frequency band. In other embodiments, the mesh network logic 120 creates the wireless mesh network using the 6 GHz frequency band. Alternatively, the mesh network logic 120 creates the wireless mesh network using a combination of the 5 GHz and 6 GHz frequency bands.

In at least one embodiment, a cloud computing system can execute a mesh formation algorithm. In this embodiment, cloud connectivity is needed for mesh formation. In other embodiments, the mesh formation algorithm can be executed locally or without cloud connectivity. In at least one embodiment, a device will store a mesh profile in addition to other WLAN profiles.

In at least one embodiment, a leader-based approach can enable the internal mesh network after the group members have been defined. The idea is there is an elected leader to initiate the mesh at a channel, then other nodes join the mesh network. In at least one embodiment, the processing flow on the leader device is to (1) do a normal scan to connect to the home AP device using an STA interface; and (2), at the same channel of the STA interface, initiate the mesh network using the mesh ID and passphrase. In at least one embodiment, the processing flow on the non-leader device is to (1) conduct a mesh scan to join the mesh network created by the leader node using the mesh interface; (2) at the same channel of mesh interface, attempt to connect to the home AP device; and (3), then this device becomes a Type-1 node. If step (2) fails, and the home AP device is unavailable at the channel, the non-leader device can establish a GRE-tunnel with a nearby Type-1 gateway node for Internet access. An example of the setup process is illustrated and described below with respect to FIG. 6.

Figure 6:
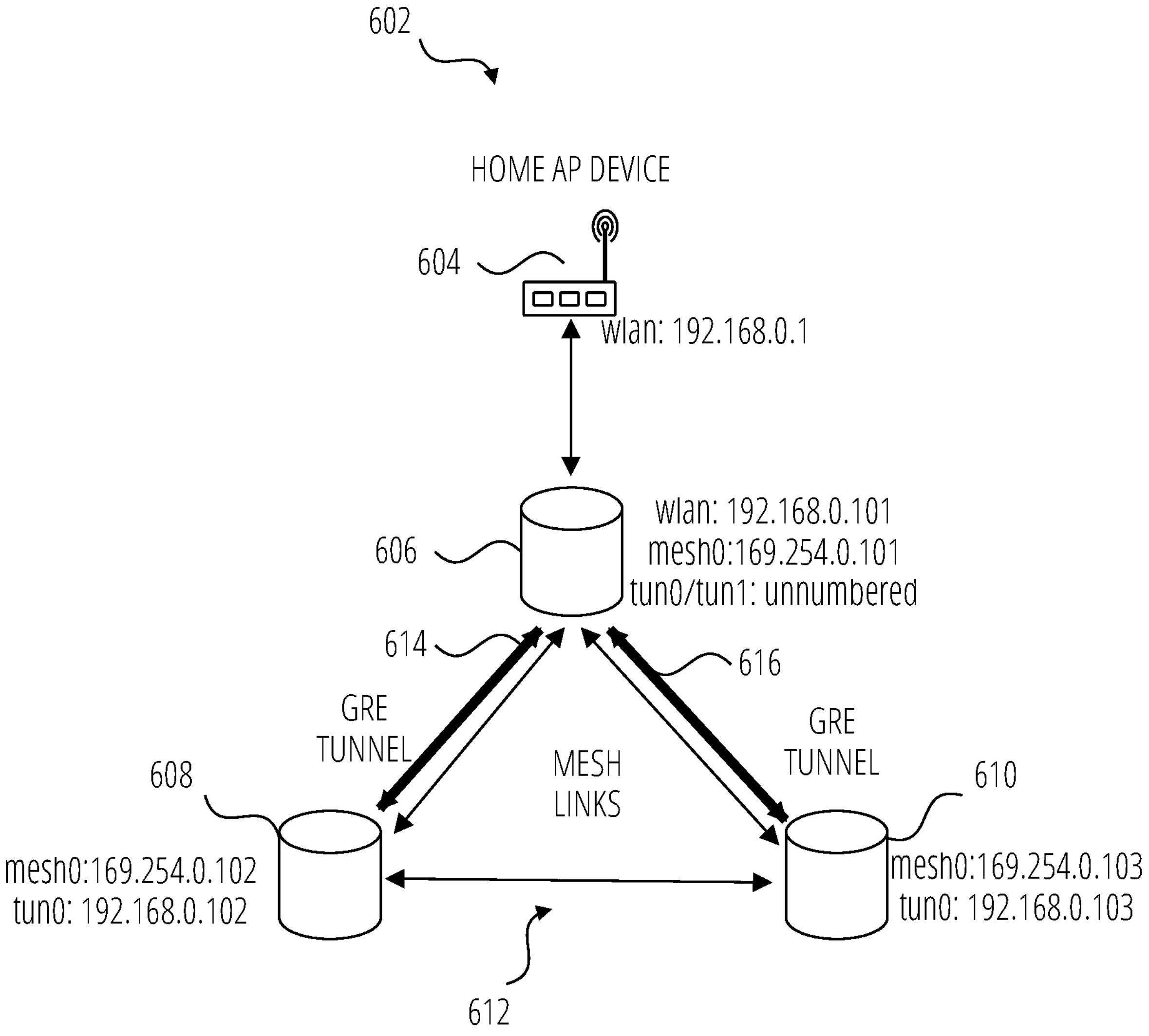
FIG. 6 is a network diagram of a home wireless network 602 with a home AP device 604 and multiple wireless devices 606, 608, 610, some having GRE tunnels via a wireless mesh network 612 to the home AP device 604 according to at least one embodiment.

FIG. 6 is a network diagram of a home wireless network 602 with a home AP device 604 and multiple wireless devices 606, 608, 610, some having GRE tunnels via a wireless mesh network 612 to the home AP device 604 according to at least one embodiment. The step-by-step procedures to set up the wireless mesh network 612 with three nodes, wireless device 606, wireless device 608, and wireless device 610. Each of the wireless devices 606, 608, and 610, can run 802.11s/STA concurrently mode on Type-1 nodes and tunneled 802.11s bridging mode on type-2 nodes. A WLAN driver can support 802.11s/STA concurrent mode at the same channel.

As illustrated in FIG. 6, the 802.11s/STA current mode and GRE bridge mode can operate on wireless device 606. At the wireless device 606, two configuration files, "wpa_sta.conf" and "wpa_mesh," can be created for wpa_supplicant. The configuration file "wpa_sta.conf" can be used to connect the wireless device 606 to the home AP device 604 at a first channel (e.g., channel 36 (frequency 5180)). The configuration file "wpa_mesh.conf" can create the wireless mesh network 612 at the same channel (e.g., channel 36). Examples of the configuration files are expressed below:

```
#wpa_sta.conf
network={ssid
  ="Home AP"
  psk="12345678"
}
#wpa_mesh.conf
ctrl_interface=/var/run/wpa_supplicant_mesh
user_mpm=1
network={
  ssid="demo mesh"
  mode=5
  frequency=5180
  key_mgmt=SAE
  psk="123456789a"
```

In at least one embodiment, two wpa_supplicant instances can be started to connect to home AP device 604 and create the wireless mesh network 612. An example is provided below:

```
sudo wpa_supplicant—i wlan0—c wpa_sta. conf—B
sudo dhclient wlan0
sudo iw phy phy0 interface add mesh0 type mp
sudo wpa_supplicant—i mesh0—c wpa_mesh. conf—B
sudo ifconfig mesh0 169.254.0.101
```

After STA interface "wlan0" and mesh interface "mesh0" are configured by wireless device 606, the wireless device 606 can create two GRE tunnel interfaces 614 and 616 ("tun0" and "tun1") for wireless device 608 and wireless device 610, respectively. The wireless device 608 can then bridge "tun0" and "tun1" with the upstream interface wlan0 using BridgeD. An example is shown below:

```
sudo ip link add tun0 type gretap remote 169.254.0.102
  dev mesh0
sudo ip link add tun1 type gretap remote 169.254.0.103
  dev mesh0
sudo ifconfig tun0 up
sudo ifconfig tun1 up
sudo bridged—U wlan0—I tun0—I tun1—m—1 &
```

802.11s and GRE tunnel interfaces on device 2

In at least one embodiment, the wireless device 608 can use the same configuration file, wpa_mesh.conf, to join the mesh network "demo_mesh." And then, the wireless device 608 can establish a GRE tunnel with wireless device 606 (e.g., 169.254.0.101) over the wireless mesh network 612 to obtain Internet/LAN access. An example is shown below:

```
sudo iw phy phy0 interface add mesh0 type mp
sudo wpa_supplicant—i mesh0—c wpa_mesh. conf—B
sudo ifconfig mesh0 169.254.0.102
sudo ip link add tun0 type gretap remote 169.254.0.101
  dev mesh0
sudo dhclient tun0
```

In at least one embodiment, the wireless device 610 can use the same configuration file, wpa_mesh.conf, to join the mesh network "demo_mesh." And then, the wireless device 610 can establish a GRE tunnel with wireless device 606 (e.g., 169.254.0.101) over the wireless mesh network 612 to obtain Internet/LAN access. An example is shown below:

```
sudo iw phy phy0 interface add mesh0 type mp
sudo wpa_supplicant—i mesh0—c wpa_mesh. conf—B
sudo ifconfig mesh0 169.254.0.103
sudo ip link add tun0 type gretap remote 169.254.0.101
  dev mesh0
sudo dhclient tun0
```

Figure 7:
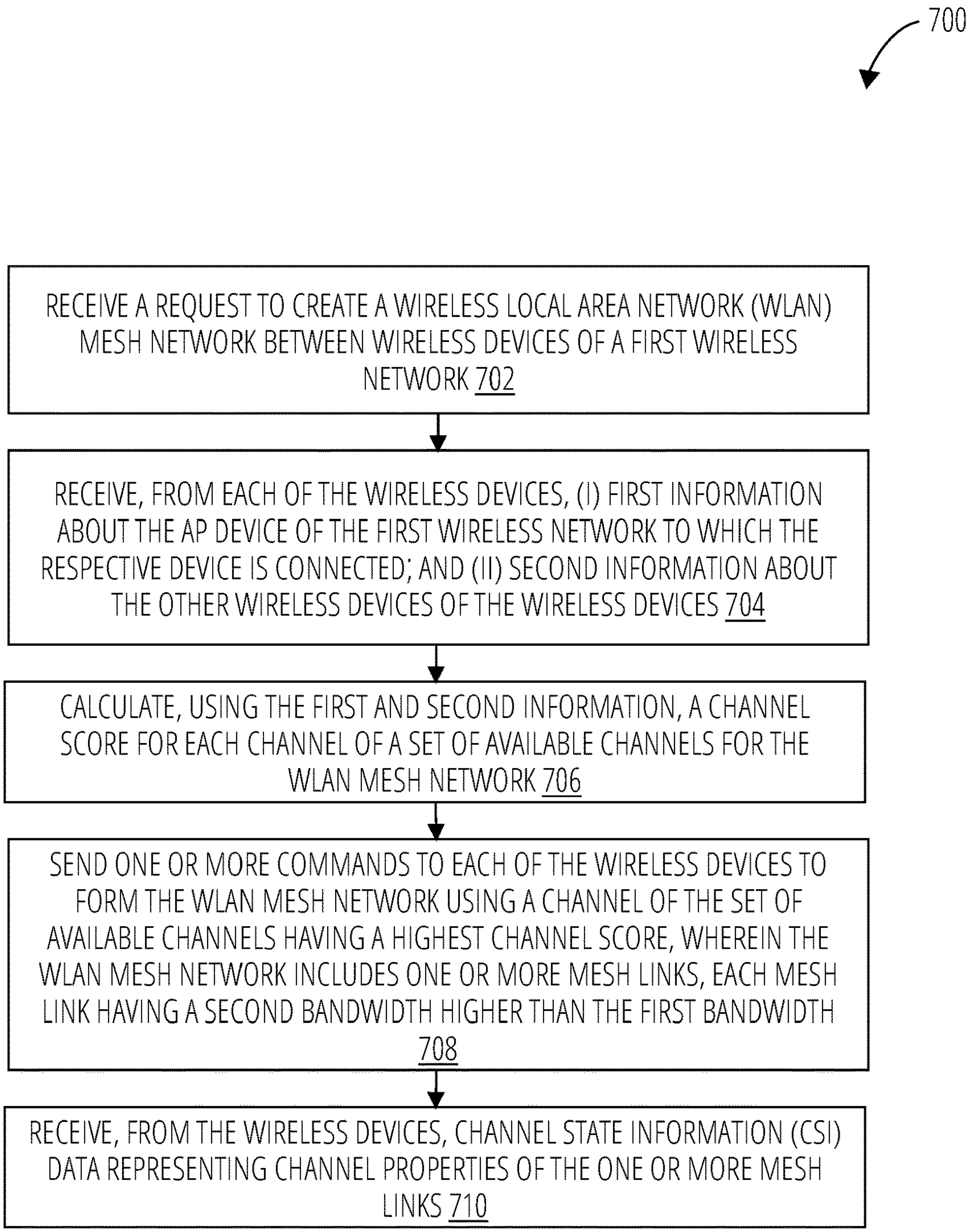
FIG. 7 is a flow diagram of a method for creating a wireless local area network (WLAN) mesh network for collecting channel state information (CSI) data on mesh links between wireless devices of a home wireless network according to at least one embodiment.

FIG. 7 is a flow diagram of a method 700 for creating a wireless local area network (WLAN) mesh network for collecting channel state information (CSI) data on mesh links between wireless devices of a home wireless network according to at least one embodiment. The method 700 may be performed by processing logic that may comprise hardware (e.g., circuitry, dedicated logic, programmable logic, microcode, etc.), software (such as instructions running on the processor), firmware, or a combination thereof. In one embodiment, a computing system of a cloud computing system performs the method 700. In at least one embodiment, one or more processors perform the method 700. Alternatively, other components of disclosed devices may perform some or all of the operations of the method 700.

With further reference to FIG. 7, the method 700 may begin with the processing logic receiving a request to create a WLAN mesh network between a wireless device (e.g., STA) of a first wireless network (block 702). The wireless devices are connected to one or more home AP devices of the first wireless network over one or more wireless links each having a first bandwidth (e.g., 20 MHz or 40 MHz). The WLAN mesh network can be a mesh network that is compliant with the IEEE 802.11s standard. At block 704, the processing logic receives from each of the wireless devices (i) first information about an access point (AP) device of the first wireless network to which the respective device is connected; and (ii) second information about the other wireless devices neighboring the respective device. At block 706, the processing logic calculates, using the first and second information, a channel score for each channel of a set of available channels for the WLAN mesh network. At block 708, the processing logic sends one or more commands to each of the wireless devices to form the WLAN mesh network using a channel of the set of available channels having a highest channel score. The WLAN mesh network, once formed, includes one or more mesh links, each mesh link having a second bandwidth (e.g., 80 MHz) higher than the first bandwidth (e.g., 40 MHz or 20 MHz). At block 710, the processing logic receives, from the wireless devices, CSI data representing channel properties of the one or more mesh links.

In at least one embodiment, the processing logic determines, using the CSI data and an ML model, whether an environment in which the wireless devices are located has been disrupted by a presence or motion of a person. In at least one embodiment, the processing logic detects, using the CSI data and the ML model, a presence or motion of a person in the environment. Alternatively, the CSI data can be used for other CSI sensing applications as described herein.

In at least one embodiment, the processing logic calculates the channel score at block 706 by performing the following: (i) determining a first score (also referred to herein as a "band score") using a band type (e.g., 2.4 GHz, 5 GHZ, 6 GHZ) of the respective channel; (ii) determining a second score (also referred to as "channel busyness score") using an amount of utilization of the respective channel; (iii) determining a third score (also referred to herein as an "AP-STA link score") using a data rate of the one or more wireless links on the respective channel; (iv) determining a fourth score (also referred to herein as a "penalty score") associated with any of the wireless devices that is indirectly connected (i.e., cannot directly connect) to the one or more home AP devices on the respective channel; and (v) determining the channel score by adding the first, second, and third scores and subtracting the fourth score. In at least one embodiment, the first score (e.g., band score) and second score (e.g., channel busyness score) are part of a channel base score. In at least one embodiment, the third score can be a summation of all of the AP-STA link scores. The third score can be added to the channel base score, whereas the fourth score can be subtracted from the third score to obtain the total channel score. Examples of computing these scores are described below with respect to FIG. 8 and FIG. 9.

In at least one embodiment, the processing logic, in response to the request at block 702, can send one or more commands sequentially to the wireless devices to cause each of the wireless devices to scan for the one or more home AP devices and the neighboring wireless devices of the first wireless network to obtain the first information and the second information. In at least one embodiment, the first information includes: (i) a device identifier of the respective wireless device sending the first information; (ii) an identifier of the AP device; (iii) an identifier of a frequency band associated with the AP device; and (iv) an identifier of a channel. In at least one embodiment, the second information includes: (i) the device identifier of the respective device sending the second information; (ii) a device identifier of at least one of the other wireless devices; (iii) an RSSI value associated with the at least one of the other wireless devices; (vi) an identifier of a channel used by the at least one of the other wireless devices; and (v) data rate associated with the channel. It should be noted that the second information can include information about any discoverable device by the device reporting the second information. An example of sending commands to each of the wireless devices to perform scans to obtain the first and second information is illustrated and described below with respect to a cloud-based implementation of FIG. 11.

In at least one embodiment, the processing logic can select one of the wireless devices as a leader of the WLAN mesh network. The selection can be made using various techniques, including assigning a permanent leader or dynamically selecting one of the wireless devices based on some metrics.

In at least one embodiment, the second information includes an RSSI value indicative of a wireless signal associated with a mesh link between each pair of wireless devices. The processing logic can calculate, for each of the one or more mesh links, a first score using the respective RSSI value. The processing logic can calculate, for each of the wireless devices, a second score by summing the first scores of the one or more mesh links. The processing logic can send information to each of the plurality of wireless devices, the information identifying a first wireless device of the plurality of wireless devices as a leader of the WLAN mesh network. The information can cause the first wireless device to initiate the formation of the WLAN mesh network using the channel, a mesh identifier (ID), and a passphrase.

In at least one embodiment, the second information includes a media access control (MAC) address of each wireless device and a respective RSSI value associated with a mesh link between each pair of wireless devices. The processing logic can generate, using the MAC addresses and the RSSI values, data representing a topology of the first wireless network. The processing logic can determine, from the data, a longest path in the first wireless network. The processing logic can identify a first wireless device of the wireless devices at or near the center of the longest path. The processing logic can send information to each of the wireless devices, the information identifying the first wireless device as a leader of the WLAN mesh network. The information can cause the first wireless device to initiate the formation of the WLAN mesh network using the channel, a mesh ID, and a passphrase. Additional details of leader selection are described below with respect to FIG. 12 and FIG. 13.

802.11s Channel Selection and Mesh Forming Algorithms

In some embodiments, the AP selection algorithm may be overridden. In some cases, the default behavior of devices is to use an AP selection algorithm to choose a best AP to connect to at a given point in time. In order to join a mesh network, a device may have to stop communicating with the best-chosen AP on a given channel and start communicating on a sub-optimal channel. The mesh network has to be set up before data can be exchanged over it. The neighbor discovery might involve multiple additional scans. Leader selection, channel selection, and mesh formation can take some time. The new mesh forming algorithm executing on the device can override the AP selection algorithm and make devices form mesh links.

In at least one embodiment, a user can select devices to potentially be part of a mesh network. Identifiers of these devices can be stored in a mesh candidate list. During the initial device setup, a user can add a new device to be part of the mesh network. This can happen from a companion application or a device graphical user interface (GUI). The information can be stored in a cloud service and provided to each device. A mesh profile can be created on the device and is valid until deleted. When a device with such a profile is powered on, it can scan for both mesh networks and AP devices and try to connect to them. Devices not present in the mesh candidate list do not perform these mesh-related operations. In some cases, when a centralized controller algorithm is trying to start a new mesh network, potentially only a subset of devices in the mesh candidate list could be online since some devices may be in a powered-off state or not online.

A centralized controller algorithm can consider the online devices during mesh channel selection and ignore the rest.

Specifically, when the centralized controller algorithm verifies if the mesh network is a fully connected graph, it only needs to check for a subset of currently online devices. The channel selection algorithm can find the optimal channel for mesh operation. The mesh channel should be selected such that: (1) the channel is relatively cleaner; (2) the number of Type-1 nodes is more than Type-2 nodes; (3) the number of Type-2 nodes is less than Type-1 nodes; (4) Type-2 nodes have optimal hop count to reach the Internet/LAN.

In at least one embodiment, the channel selection algorithm can find a list of channels where a connectable AP/Basic Service Set Identifier (BSSID) is found. For each such channel, the channel selection algorithm can compute a score. The score can be a weighted sum of different parameters. The channel with the highest score can be selected for 802.11s mesh network formation. In this embodiment, all devices can start operating on this channel and connect to an AP/BSSID in the same channel if the AP/BSSID is in range. Additionally, the device will form mesh links with all the neighboring devices in its range. In at least one embodiment, a total channel score can be computed as follows:

Total channel score=Channel base score+AP-STA links score−Penalty for STAs connected indirectly to AP The channel base score is the score that enumerates the basic characteristics of the channel and its current state. The AP-STA links score is a score that tracks a quality of WLAN links between any of the home AP in the channel and all nodes that are attempting to form the Mesh. Having many nodes directly connected to a home AP in the channel will be desirable. The penalty for STAs connected indirectly to AP Nodes too far away from all home AP devices in the channel will indirectly get access to the Internet through its mesh link. This means the data sent or received by those nodes will take multiple hops to eventually reach the home AP. This can further increase the busyness in the channel.

In at least one embodiment, the channel base score can assign values for the following parameters as set forth in Table 3.

TABLE 3

| Parameter | Comments | Value |
|---|---|---|
| Band Type (2G, 5G, 6G) | The following should be the order of preference: 6G=>5G=>2G | 3 (6G), 2 (5G), 1 (2G) |
| Channel Utilization | Better to avoid busier channels | 0-100% |
| Number of Home AP devices in the channel | More home AP devices in the same channel maybe good if spaced out well - Many nodes can have direct access to the Internet | # |
| Number of Non-Home AP devices in the channel | More non-home AP devices in the same channel could make the channel very busy | # |
| Number of new STA in the channel (Type-1) | If this channel is selected for forming Mesh links, the number of new STAs(nodes) that will move into this channel from others | # |

Alternately, a standardized AP scoring logic can be available on multiple devices, and the best scores can be published in an IE (instead of, or in addition to, all the individual parameters). When all home AP devices are too far away from a node in a channel (e.g., decided by a pre-defined threshold), a direct link to the home AP device should be avoided to not worsen the channel condition. Instead, the node should use the best Mesh link to get access to the Internet/LAN.

In at least one embodiment, the Penalty for STAs connected indirectly to AP can be determined from the following parameters as set forth in Table 5.

TABLE 5

| Parameter | Comments |
|---|---|
| Number of hops or link-cost (RSSI to AP) to reach a home AP device | #/RSSI |

In another embodiment, the channel base score can be assumed to be a band score plus a channel utilization score as follows:

Channel base score=band score+channel busyness score

An example of the band scores is set forth below in Table 6.

TABLE 6

| Band Type | Scores |
|---|---|
| 2.4 GHz | 0 |
| 5 GHz | 25 |
| 6 GHZ | 50 |

The channel busyness score (utilization) can be measured as a percentage of usage of the channel as follows:

Channel busyness score=100−measured channel utilization

In at least one embodiment, the AP-STA links score can be determined from the following parameters as set forth in Table 4.

TABLE 4

| Parameter | Comments |
|---|---|
| Link RSSI | 52 dB |
| Noise Floor in Channel | 5 dB |
| Number of spatial streams | # |
| channel bandwidth | 20, 40, 80 (or higher) |

The individual AP-STA link scores can indicate the quality of the WLAN link as seen by the STA, ranging between 0 and 10, as shown in Table 7.

TABLE 7

| Score | Quality |
|---|---|
| 0 | Worst |
| . . . | |
| 5 | Moderate |
| . . . | |
| 10 | Best |

In another embodiment, the individual AP-STA link score can be calculated using a data rate of the STA (e.g., actual stable transmission/receive data rate). The transmission rate is already factored in the RSSI, signal-to-noise ratio (SNR), and packet error rate. In at least one embodiment, the individual link score is calculated using the following:

Individual link score=(current data rate/peak data rate)*10

The AP-STA link score can be a summation of the individual link scores (Type-1 nodes) as expressed in the following:

AP-STA link score=Σ all individual link score

In at least one embodiment, the penalty for STAs connected indirectly to AP (Type-2 nodes) can be calculated as follows:

Penalty score for one indirectly connected STA (Type-2 nodes)=(10−average(all WLAN links from Type-2 nodes till the AP)/number of links;

Penalty for STAs connected indirectly to AP=Σ penalty score of all indirectly connected STAs An example of the score calculations is illustrated and described below with respect to FIG. 8 and FIG. 9.

Figure 8:
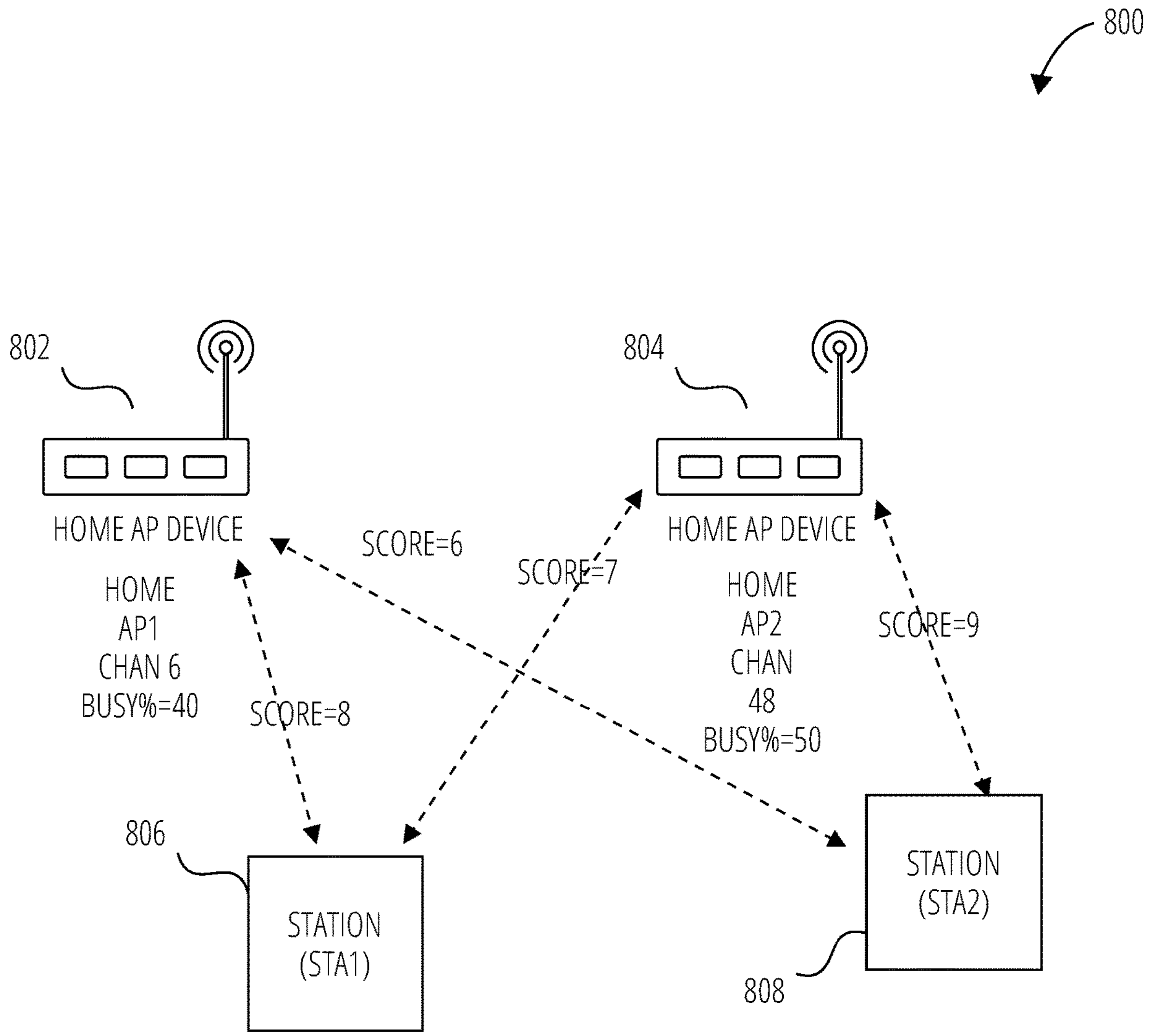
FIG. 8 illustrates a scenario where a channel selection algorithm avoids a 2.4 GHz channel according to one implementation.

FIG. 8 illustrates a scenario 800 where a channel selection algorithm avoids a 2.4 GHz channel according to one implementation. In scenario 800, there are two home AP devices 802, 804, and two stations 806, 808 (STAs). The first home AP device 802 is operating on channel 6, a channel of the 2.4 GHz band with a busy percentage of 40%. The second home AP device 804 operates on channel 48, which is a channel of the 5 GHz band and has a busy percentage of 50%. The channel selection algorithm can compute a first channel base score for the first home AP device 802 as 60 by adding the band score of zero to the channel busyness score of 60. The channel selection algorithm can compute a second channel base score for the second home AP device 804 as 75 by adding the band score of 25 to the channel busyness score of 50. The channel selection algorithm can determine a first AP-STA link score of 14 by summing the individual AP-STA scores of the links on the first channel (e.g., 8+6=14). The channel selection algorithm can determine a second AP-STA link score of 16 by summing the individual AP-STA scores of the links on the second channel (e.g., 7+9=16). In this case, there are no penalties for indirectly connected STAs, so the channel selection algorithm determines a first total channel score for channel 6 as 74 and a second total channel score for channel 48 as 91. Since 91 is a greater score, the channel selection algorithm selects channel 48 for the 802.11s/STA concurrent mode operations.

Figure 9:
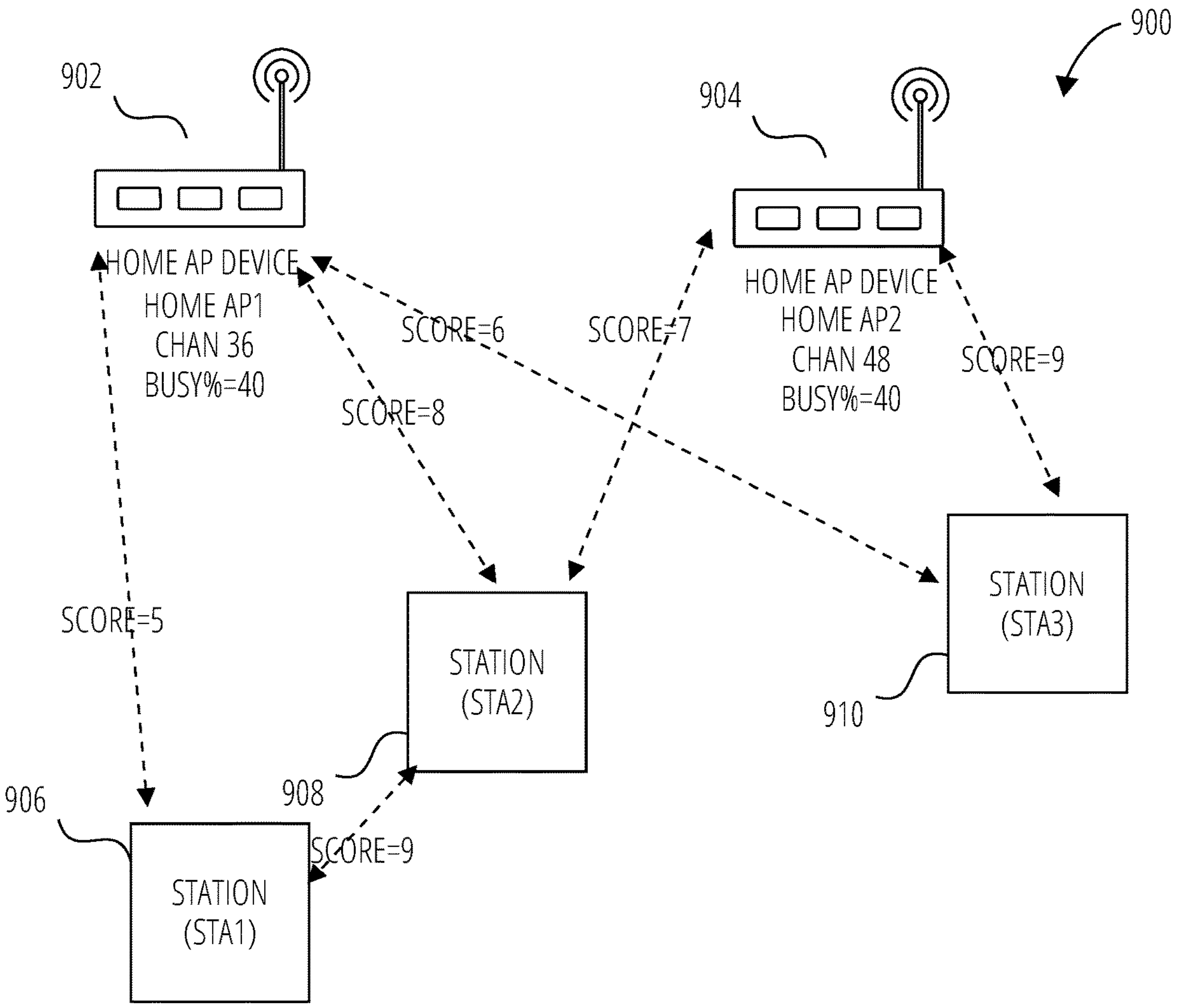
FIG. 9 illustrates a scenario where a channel selection algorithm prefers Type-1 nodes over Type-2 nodes according to one implementation.

FIG. 9 illustrates a scenario 900 where a channel selection algorithm prefers Type-1 nodes over Type-2 nodes according to one implementation. In scenario 900, there are two home AP devices 902, 904 and three stations 906, 908, 910 (STAs). The first home AP device 902 operates on channel 36, a channel of the 5 GHz band with a busy percentage of 40%. The second home AP device 804 operates on channel 48, a channel of the 5 GHz band with a busy percentage of 40%. The channel selection algorithm can compute a first channel base score for the first home AP device 802 as 85 by adding the band score of 25 to the channel busyness score of 60. The channel selection algorithm can compute a second channel base score for the second home AP device 804 as 85 by adding the band score of 25 to the channel busyness score of 60. The channel selection algorithm can determine a first AP-STA link score of 19 by summing the individual AP-STA scores of the links on the first channel (e.g., 5+8+6=19). The channel selection algorithm can determine a second AP-STA link score of 16 by summing the individual AP-STA scores of the links on the second channel (e.g., 7+9=16). In this case, there is a penalty for the home AP device 904, so the channel selection algorithm determines a penalty score of 6 using the equation described above. The channel selection algorithm determines a first total channel score for channel 6 as 104 and a second total channel score for channel 48 as 95. Since 104 is a greater score, the channel selection algorithm selects channel 36 for the 802.11s/STA concurrent mode operations.

Method for Channel Scoring—Throughput Based

In at least one embodiment, the channel scoring can be throughput based. In this embodiment, the wireless devices can measure a throughput metric representing how much data can be sent or received from a home AP device. This can be measured using a speed test. There are two kinds of speed tests: a local speed test and an Internet speed test. The throughput metric indirectly implies a channel base score and the AP-STAs link score of that specific link. Before Mesh formation, all nodes can connect to the best AP selected by their AP selection algorithm. The nodes can perform a quick speed test and report the results in a mesh IE to the centralized controller. The Local speed test can indicate a maximum channel capacity. The Internet speed test can be an end-to-end test, providing a good indication of achievable Internet throughput. The channel selection algorithm can select the channel of the AP providing the best throughput as the channel to be used for mesh formation.

Method for Channel Scoring—Leveraging AP Ranking Logic

In some embodiments, the wireless devices can have local AP ranking logic. The local AP raking logic can rank each home AP device based on multiple parameters, like RSSI, radio technology, channel congestion, etc. The device then selects the best available home AP device and connects to it. This existing AP ranking logic can be leveraged to find the best channel acceptable to all or most nodes. The mesh links can be formed in that channel. In this case, nodes that can communicate with the home AP devices in that channel can connect to one of the home AP devices, becoming Type-1 nodes. Other nodes can connect to the best possible Type-1 node, becoming a Type-2 node. Type-2 nodes can get Internet access through the Type-1 node.

In at least one embodiment, the AP ranking logic on each device can publish its results, such as the top 5 or 10 entries, in a probe response or to a centralized controller to indicate the AP channel preferences. Each entry can be in the form <BSSID, SSID, Channel, RSSI, Rank #, etc.>. Once the AP/Channel preference list from all nodes is available, a channel selection algorithm on a centralized controller can process this information. For example, all entries that have RSSI less than a pre-defined threshold (e.g., −75 dBm) can be ignored. The remaining entries can be used to create an aggregate channel score. The aggregate channel score can indicate a "good" channel that works (acceptable) for all or most nodes. The mesh formation can be aborted if there is no AP with acceptable RSSI or the mesh is not fully connected (i.e., one or more nodes are far away and isolated from others). The AP ranking logic indirectly implies the scoring of the channel base score and the AP-STA links score, as described above. An example of the AP ranking-based score is illustrated and described in more detail with respect to FIG. 10.

Figure 10:
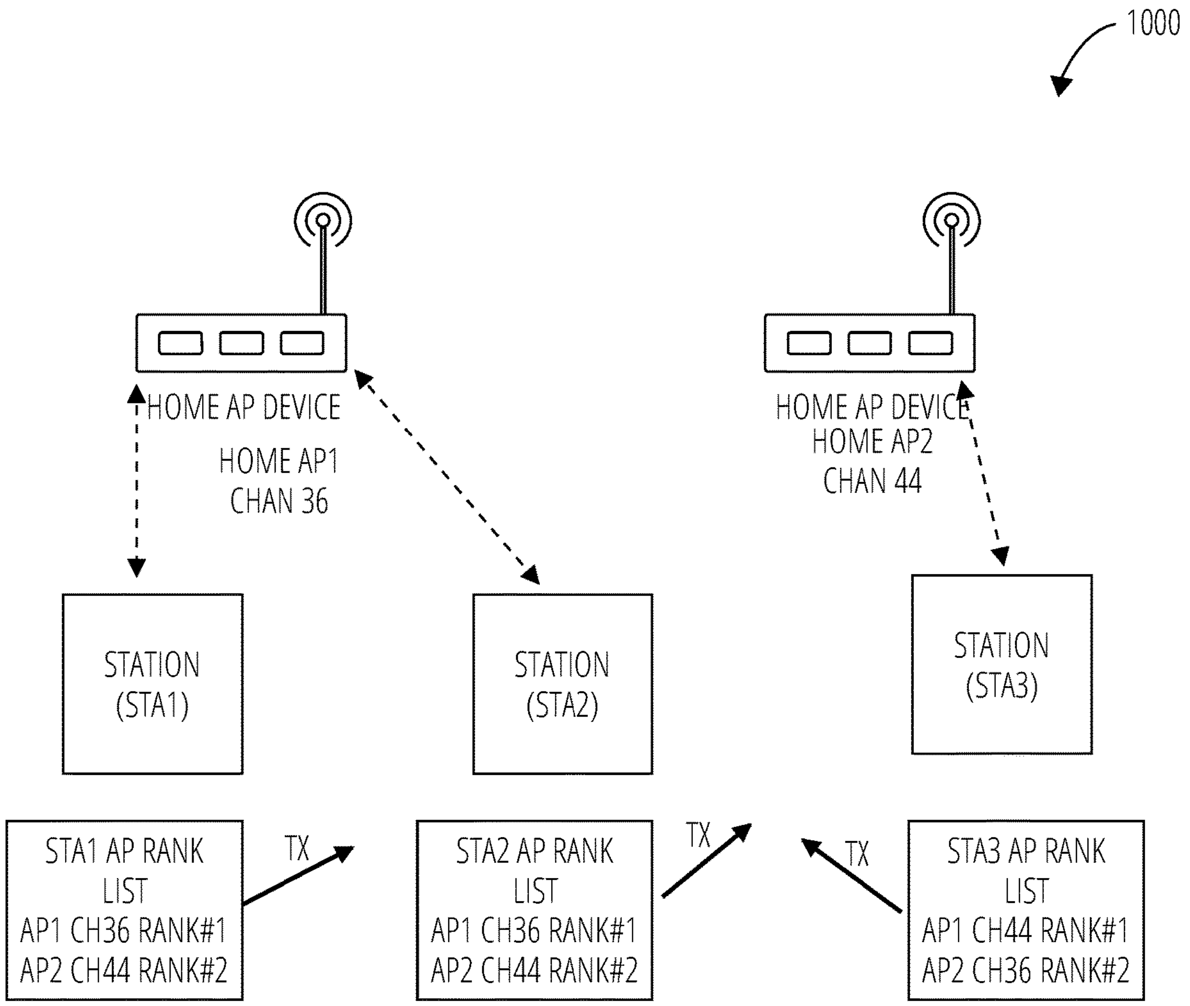
FIG. 10 illustrates a scenario where a channel selection algorithm uses AP ranking logic according to at least one embodiment.

FIG. 10 illustrates a scenario 900 where a channel selection algorithm uses AP ranking logic according to at least one embodiment. The channel selection algorithm can compute an aggregate channel score of 29 for channel 36 (aggr_chan_score [ch36]=10+10+9=29) and an aggregate channel score of 28 for channel 44 (aggr_chan_score [ch44] =9+9+10=28). In this scenario 900, channel 36 is the best acceptable channel and will be used for mesh formation. Different tie-breaker rules can be used by the channel selection algorithm in the event that two or more channels have the same score.

In at least one embodiment, the mesh formation can be aborted if any participating node does not have a direct connection to the home AP device or needs more than a threshold number of hops to reach a home AP device. In another embodiment, the mesh formation can be aborted if more than 'X' nodes do not have a direct connection to the home AP device or do not depend on a specific Type-1 node for Internet/LAN access.

AP Rank List Synchronization

In at least one embodiment, a centralized controller can receive all nodes' rank lists. The centralized controller can aggregate the rank lists and make mesh formation decisions. In other embodiments, this can be done locally, but there may be scenarios where out-of-range nodes do not need all the information to be processed. In short, databases at the respective nodes may be out-of-sync. Referring back to FIG. 10, if STA 3 is not in the range of STA 1, then STA's rank list will be only available to the databases of STA 2 and STA 1 will be out-of-sync with databases of STA 2 and STA 3. So, there should be a mechanism by which each node can forward the information to a centralized controller, such as the centralized controller. This way all the nodes will be in sync. In some cases, the local mesh channel selection is supported, and the centralized controller can help with the mesh channel selection and initiation of the mesh network. After that, nodes can make local decisions whenever the topology changes if the mesh operating channel does not need a change. The centralized controller could get involved and repeat the process if the mesh operating channel needs an update. The channel selection algorithm can consider various factors to obtain a unified score for the connection quality of Type-2 nodes, such as the number of Type-2 nodes and a number of hops each Type-2 node needs to reach a home AP device.

Centralized Controller-Based Implementation

Figure 11:
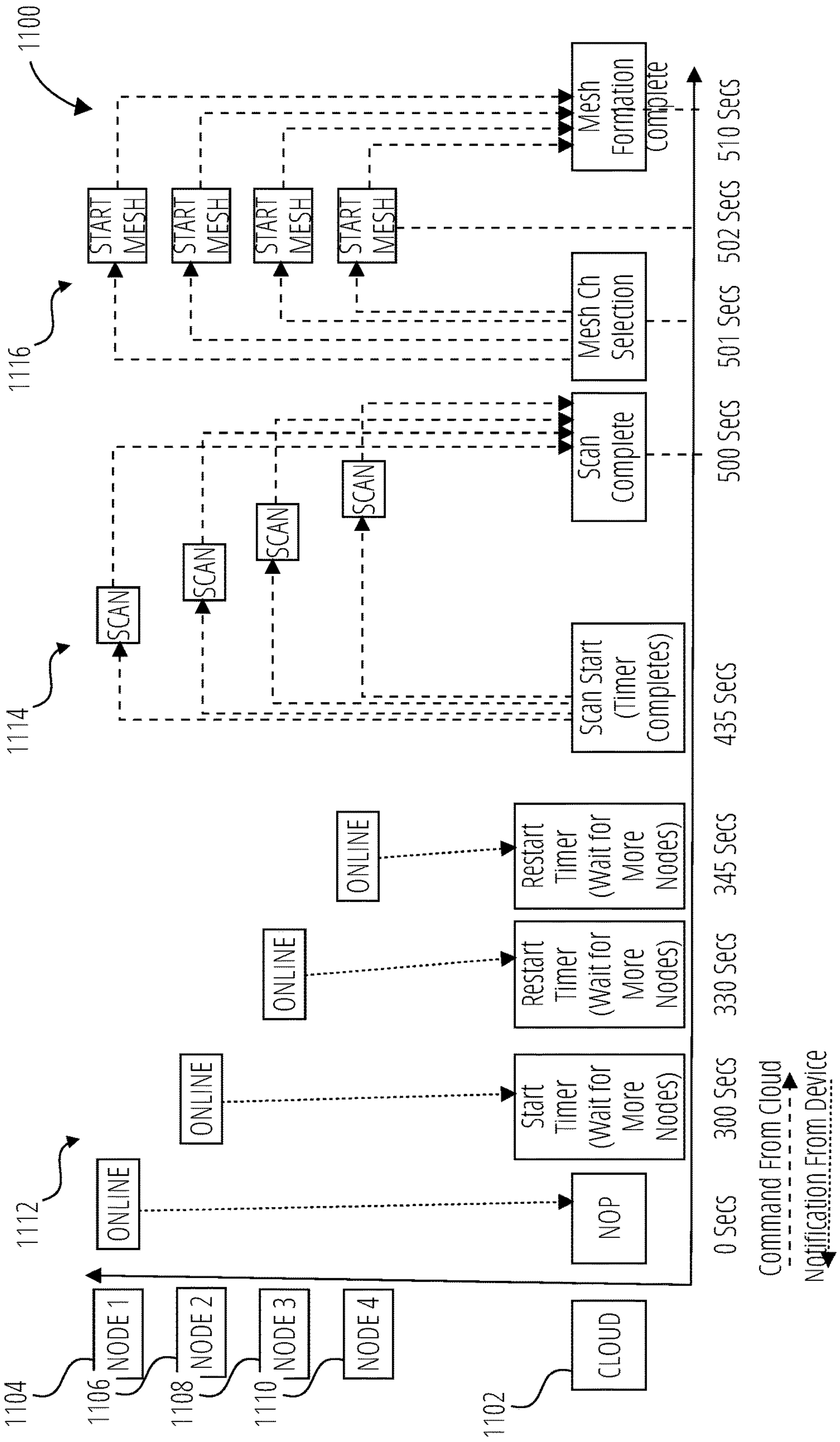
FIG. 11 is a flow diagram of a cloud-based method for channel selection and mesh formation according to at least one embodiment.

FIG. 11 is a flow diagram of a cloud-based method 1100 for channel selection and mesh formation according to at least one embodiment. The cloud-based method 1100 may be performed by processing logic that may comprise hardware (e.g., circuitry, dedicated logic, programmable logic, microcode, etc.), software (such as instructions running on the processor), firmware, or a combination thereof. In one embodiment, a computing system of a centralized controller computing system performs the cloud-based method 1100. In at least one embodiment, one or more processors perform the cloud-based method 1100. Alternatively, other components of disclosed devices may perform some or all of the operations of the cloud-based method 1100.

With further reference to FIG. 11, the cloud-based method 1100 may begin with the processing logic of the cloud controller 1102, waiting for the mesh nodes 1104, 1106, 1108, and 1110 to be powered up. When the mesh nodes are powered up, they can connect to an AP selected by their local AP selection algorithm. In addition, the mesh nodes 1104, 1106, 1108, and 1110 can search for an existing mesh network and join it if possible. If mesh connection parameters seem acceptable, preference should be given to joining the mesh network. The mesh node may have to disconnect from the best AP that it selected and move to a different channel. That is, the mesh node may have to cease communicating with the AP on one channel to another channel (or to another intervening device, as described herein). If a local mesh 'join' is not possible, the mesh node can report to the cloud controller 1102 their intent to be part of a mesh network after getting Internet access via the home AP device.

During operation, the cloud controller 1102 does not need to act when a first mesh node 1104 has reported its intent to form a mesh network. The cloud controller 1102 can wait until one or more nodes are online. If a mesh network is not created yet, whenever a new node comes online, the cloud controller 1102 can wait for a specified delay (e.g., 90 seconds) to see if more nodes are coming up. This can account for the delay in user powering on the mesh nodes 1104, 1106, 1108, and 1110, node boot-up time, and network latency during a phase 1112 of the cloud-based method 1100.

After the phase 1112 is over, the cloud controller 1102 can issue scan commands to different mesh nodes 1104, 1106, 1108, 1110, allowing the mesh nodes to scan for home AP devices and other nodes in a phase 1114. In order to avoid erroneous scan results reporting due to multiple nodes being off-channel at the same time, the cloud controller 1102 can issue commands sequentially or in a pattern to avoid issuing scan commands to all nodes in parallel. All mesh nodes can report the home AP or node information to the cloud controller 1102. The cloud controller 1102 can implement channel selection logic (e.g., the channel selection algorithm described above) to compute the latest set of metrics sent by each node. The cloud controller 1102 can rank different channels based on the metrics and try to find the best channel where all nodes are online and part of a fully connected mesh network. If no such channel is available, the cloud controller 1102 can abort mesh formation, and all nodes can maintain their current connections. If one such channel is available, the cloud controller 1102 can instruct all nodes to move to that channel. Mesh nodes that can connect to the home AP device in that channel will associate with it, becoming a Type-1 node. Other nodes, if any, that cannot connect to the home AP device can connect to the best Type-1 node, becoming a Type-2 node. In the case that a node encounters any error (e.g., mesh formation failure, connection to Internet breaks, or the like, the mesh will timeout at some interval and return to its original connection before the mesh formation attempt. In at least one embodiment, at any point in time, whenever there is a major change in scenario or topology, the cloud controller 1102 can repeat the mesh channel selection, tearing down the mesh network to create a new mesh network.

Sometimes, the cloud controller 1102 can factor in some complexities with topologies with Type-2 devices. Throughput or latency issues and resource limitations can be factored in by using profile information in the device that indicates these capabilities and restrictions when forming a mesh network. For example, since the wireless medium is used to relay the same information multiple times, the effective net throughput of the mesh network could go down, and devices can have some latency issues relaying the information. Another issue is that a Type-1 (or Type-2) node supporting other Type-2 nodes may need additional hardware resources (e.g., CPU and memory resources). The different types of devices can have different hardware resources. The applications executed by these devices can be different. The amount of available hardware resources can vary with time, depending on the usage pattern. In sum, some devices may not be able to support Type-2 nodes, some devices can support one or more Type-2 nodes based on their capability and current load. One way to implement these restrictions is to share device profile information with the cloud controller 1102, and the cloud controller 1102 can use the device profile information when performing mesh formation.

In at least one embodiment, the cloud controller 1102 can implement a channel selection algorithm based on aggregating AP ranking information described above. This channel selection algorithm can consider the channel preference of Type-1 nodes and does the channel selection. In another embodiment, the cloud controller 1102 can consider parameters, like the number of Type-2 nodes and their hop counts, even though more complicated. In some cases, the mesh formation can consider only a bare-minimum support for Type-2 nodes. In other cases, the Type-2 topology can recover stranded devices for mesh formation. The devices can use this mechanism to send metrics and events to the cloud controller 1102.

Handling Topology Changes

There may be situations where topology changes occur, and the mesh network logic 120 can handle these topology changes. In at least one embodiment, a new mesh node powered up can perform the following operations. The mesh network logic 120 can scan for both home AP devices and mesh networks present in its profile. If, as a result of the scan, the mesh network logic 120 finds a mesh network already existing and the RSSI value is better than a threshold (e.g., −75 dBm), the mesh network channel can be noted. If, as a result of the scan, the mesh network logic 120 finds a home AP device present in that channel and the RSSI value is better than the threshold, the mesh network logic 120 can associate with the home AP device and join the mesh network (in the same channel), becoming a Type-1 node. In the case that the home AP device is not in the scan in the channel or its RSSI value is less than the threshold, the mesh network logic 120 can join the mesh network in the same channel, becoming a Type-2 node. If, as a result of the scan, the mesh network logic 120 does not find a mesh network or the RSSI value is less than the threshold without the need for changes from components other than connectivity, the mesh network logic 120 can associate with the home AP device by its AP selection algorithm and report mesh network status to the centralized controller. The mesh network logic 120 can configure its probe response so other nodes can discover its mesh capabilities. The mesh network logic 120 can periodically scan for home AP devices and mesh nodes in its vicinity and report to the centralized controller.

In at least one embodiment, when a home AP device is powered off or unavailable, an affected node's mesh network logic 120 can perform the following operations. The mesh network logic 120 can scan for other home AP devices in the current operating channel. If one or more home AP devices are found in the same channel and the RSSI value is better than the threshold, the mesh network logic 120 can connect to the best home AP device from the list while trying to maintain the mesh link with the other nodes in the mesh network. If no home AP devices are found, or the RSSI value is less than the threshold, the mesh network logic 120 can continue in the mesh network until a timeout and see if Internet access is available through one of the mesh links. If Internet access is available through one of the mesh links, the mesh network logic 120 can stay in the same channel and maintain the mesh links, becoming a Type-2 node. When there is no Internet access to the affected node after the time, the mesh network logic 120 can exit the mesh network, use an AP selection algorithm to find and connect to a best available AP device and report an exit event to the centralized controller.

In at least one embodiment, when a Type-1 node is powered off or otherwise unavailable, the mesh network logic 120 of a Type-2 node previously connected to the Type-1 device can perform similar operations as when the home AP device is powered off and recovered from its state. In at least one embodiment, when a Type-2 node is powered off or unavailable, the neighboring nodes (or Type-1 node) can report an event to the centralized controller.

Leader Selection

In some embodiments, one of the wireless devices can be selected and made a leader of a mesh network. The leader of the mesh network can have responsibilities and make decisions regarding mesh formation and maintenance. The other wireless devices in the mesh network are considered non-leaders. The non-leaders can receive directions (e.g., commands) from the leader and act accordingly. There can be different ways a leader is selected.

In at least one embodiment, a wireless device in the home wireless network can be selected or assigned as a permanent leader in a permanent leader mode. In the permanent leader mode, the permanent leader is selected by either a centralized controller or a user. Once selected, the wireless device will be the leader indefinitely until another wireless device is selected or assigned by the centralized controller or user. All other wireless devices in the mesh network will follow the leader. Once the wireless device is selected as the "permanent leader," a local configuration entry can be created and stored on the wireless device, the local configuration entry indicating that the wireless device is the permanent leader. During every boot-up, the wireless device can check if it is the "permanent leader" and start performing the special tasks associated with the leader. The permanent leader mode can be used in various use cases, such as an N-channel speaker system. A central unit controlling the N speakers can be selected or assigned as the permanent leader in the N-channel speaker system.

In at least one embodiment, a wireless device in the home wireless network can be dynamically selected in a dynamic leader mode. In the dynamic leader mode, a centralized controller can evaluate all wireless devices present at that point in time for certain parameters and choose a leader dynamically. It is possible that a different leader might be chosen in different sessions. In at least one embodiment, the centralized controller can utilize a leader selection algorithm. In at least one embodiment, the leader selection algorithm can calculate and use a leader connectivity score in a score-based method, such as illustrated and described with respect to FIG. 12. In at least one embodiment, the leader selection algorithm can generate and use a graph in a graph-based method, such as illustrated and described below with respect to FIG. 13.

Figure 12:
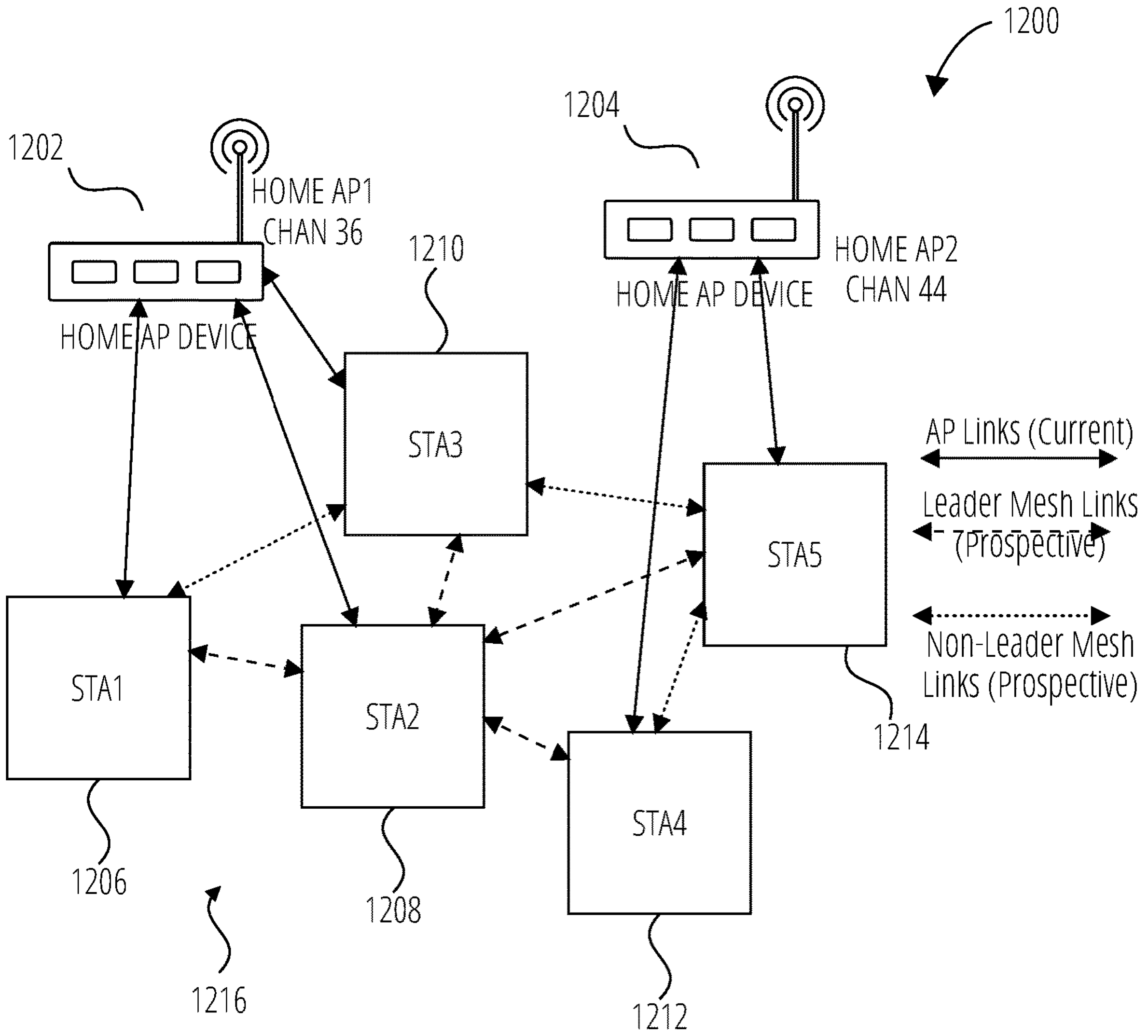
FIG. 12 is a network diagram showing a station of a home wireless network being selected as a leader of a WLAN mesh network according to at least one embodiment.

FIG. 12 is a network diagram showing a station of a home wireless network 1200 being selected as a leader of a WLAN mesh network according to at least one embodiment. The home wireless network 1200 includes a first home AP device 1202, and a second home AP device 1204. A first station 1206 and a second station 1208 are connected to the first home AP device 1202 over AP-STA links. A third station 1210, a fourth station 1212, and a fifth station 1214 are connected to the second home AP device 1204 over AP-STA links. As described herein, the WLAN mesh network 1216 can be formed with mesh links between the stations. As described herein, one of the stations can be selected as a leader dynamically using a score-based method. The leader is supposed to communicate frequently with all or most of the other nodes in the WLAN mesh network 1216, so it would be good if the leader is located at a central point in the WLAN mesh network 1216. The leader should have good mesh links with all or most nodes in the WLAN mesh network 1216. As described herein, each node that intends to be part of the WLAN mesh network 1216 can publish information to a centralized controller. In at least one embodiment, the information can include a MAC address of the neighboring node (as a result of the scan) and the RSSI value corresponding to that node. This information can be part of the MNR table described herein. The centralized controller can use this published information from all of the nodes of the WLAN mesh network 1216 to compute a neighbor connectivity score. In at least one embodiment, for each node involved in mesh formation, the centralized controller can initialize a node connectivity score to zero (e.g., node_connectivity_score [node]=0) and, for each reported neighboring node, the centralized controller can calculate a current link score using the RSSI value (e.g., current link score=100−(absolute value of the RSSI value)). The node connectivity score becomes the sum of the current link scores of as many neighboring nodes found (e.g., node_connectivity_score [node]=node_connectivity_score [node]+curr_link_score). A node having a highest value of the node connectivity scores can be selected as the leader. In FIG. 12, the second station 1208 is selected as the leader. The second station 1208 is near all the other nodes intended to form the WLAN mesh network 1216. The centralized controller can send information to each station, identifying the second station 1208 as the leader of the WLAN mesh network 1316.

Figure 13:
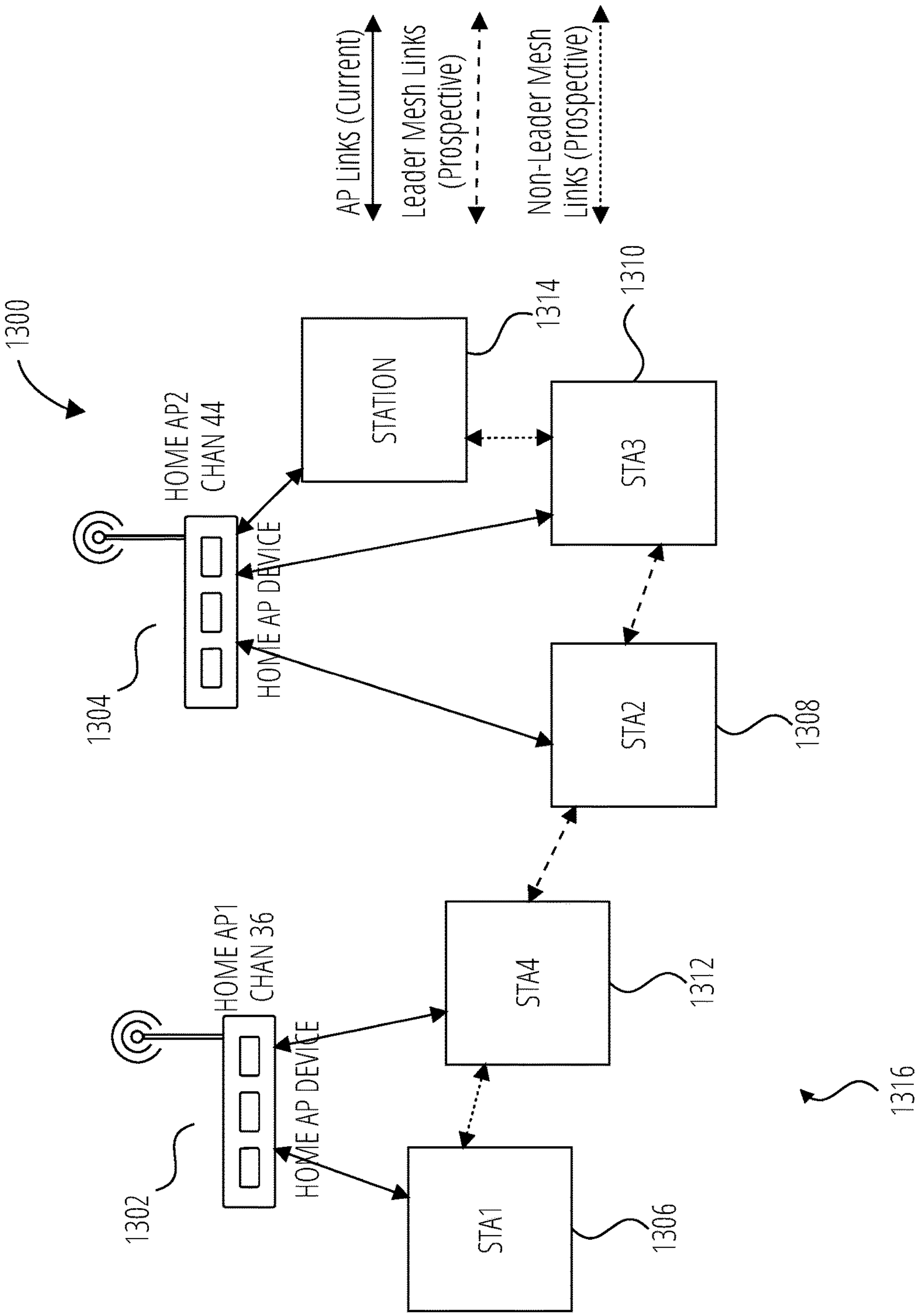
FIG. 13 is a network diagram showing a station of a home wireless network being selected as a leader of a WLAN mesh network according to at least one embodiment.

In some cases, the nodes intended to form the WLAN mesh network are formed in a linear topology, as illustrated in FIG. 13. In these cases, a score-based method may not work as well, as all or most of the nodes have similar scores. In these cases, a graph-based method may be used to find a leader, as described below with respect to FIG. 13.

FIG. 13 is a network diagram showing a station of a home wireless network being selected as a leader of a WLAN mesh network according to at least one embodiment. The home wireless network 1300 includes a first home AP device 1302, and a second home AP device 1304. A first station 1306 and a fourth station 1312 are connected to the first home AP device 1302 over AP-STA links. A second station 1308, a third station 1310, and a fifth station 1314 are connected to the second home AP device 1304 over AP-STA links. As described herein, the WLAN mesh network 1316 can be formed with mesh links between the stations. As described herein, one of the stations can be selected as a leader dynamically using a graph-based method. The leader is supposed to communicate frequently with all or most of the other nodes in the WLAN mesh network 1216, so it would be good if the leader is located at a central point in the WLAN mesh network 1316. The leader should have good mesh links with all or most nodes in the WLAN mesh network 1316. As described herein, each node that intends to be part of the WLAN mesh network 1316 can publish information to a centralized controller. In at least one embodiment, the information can include a MAC address of the neighboring node (as a result of the scan) and the RSSI value corresponding to that node. This information can be part of the MNR table described herein. The centralized controller can use this published information from all of the nodes of the WLAN mesh network 1216 to generate data representing a topology (i.e., a graph). The stations are the nodes in the graph, and the mesh links are the paths between the nodes. The centralized controller can determine a longest segment or path (non-looping path) in the topology. The centralized controller can identify a node (e.g., second station 1308) near or at a center of that segment. This node can be identified as the leader. The centralized controller can send information to each of the stations, the information identifying this node (e.g., second station 1308) as the leader of the WLAN mesh network 1316.

In at least one embodiment, the leader selection processes can use other considerations. For example, the leader has to satisfy other restrictions or conditions in order to have a stable WLAN mesh network. In at least one embodiment, the leader needs to have a quality AP link with one of the home AP devices. For example, some of the nodes in the WLAN mesh network might have a mesh link and no connection to a home AP device. The leader may have to support these nodes and provide Internet/LAN access to them. Thus, the quality of the Leader's AP link should be particularly good.

As described above, the leader can have different responsibilities. Once the centralized controller selects a leader (permanent or dynamic), the leader is expected to manage the WLAN mesh network and can make local decisions about the WLAN mesh network. In at least one embodiment, one of the leader's responsibilities is selecting a channel for the WLAN mesh network. The channel for the WLAN mesh network can also be referred to as the mesh operating channel. The channel selection approaches described above are for centralized controller-based implementations and may not work locally since all nodes may not be in the range of every other node. As such, the leader can use different local channel selection approaches, such as the leader's AP-scoring approach or the neighbors' AP-preference approach. In the leader's AP-scoring approach, the leader can perform a scan and determines AP-STA link scores of all home AP devices in its vicinity. The leader picks the home AP device with the highest AP-STA link score and associates with that home AP device. The leader can use the corresponding channel for that AP-STA link as the mesh operating channel used for the WLAN mesh network. In this approach, the preference of other nodes in the network is not considered in channel selection. In the neighbors' AP-preference approach, the leader can perform a mesh scan to find nearby mesh nodes. The leader can determine the channel each node operates on before mesh formation. The leader can assume that this is the channel preferred by that node. The leader can aggregate this information to find the channel preferred by all or most nodes. The leader can check if it can connect to an AP in that same channel with an acceptable connection quality. If the connection quality is good enough, the leader can choose that channel as the mesh operating channel. Otherwise, the leader can select the channel according to the leader's AP-scoring approach described above.

Figure 14:
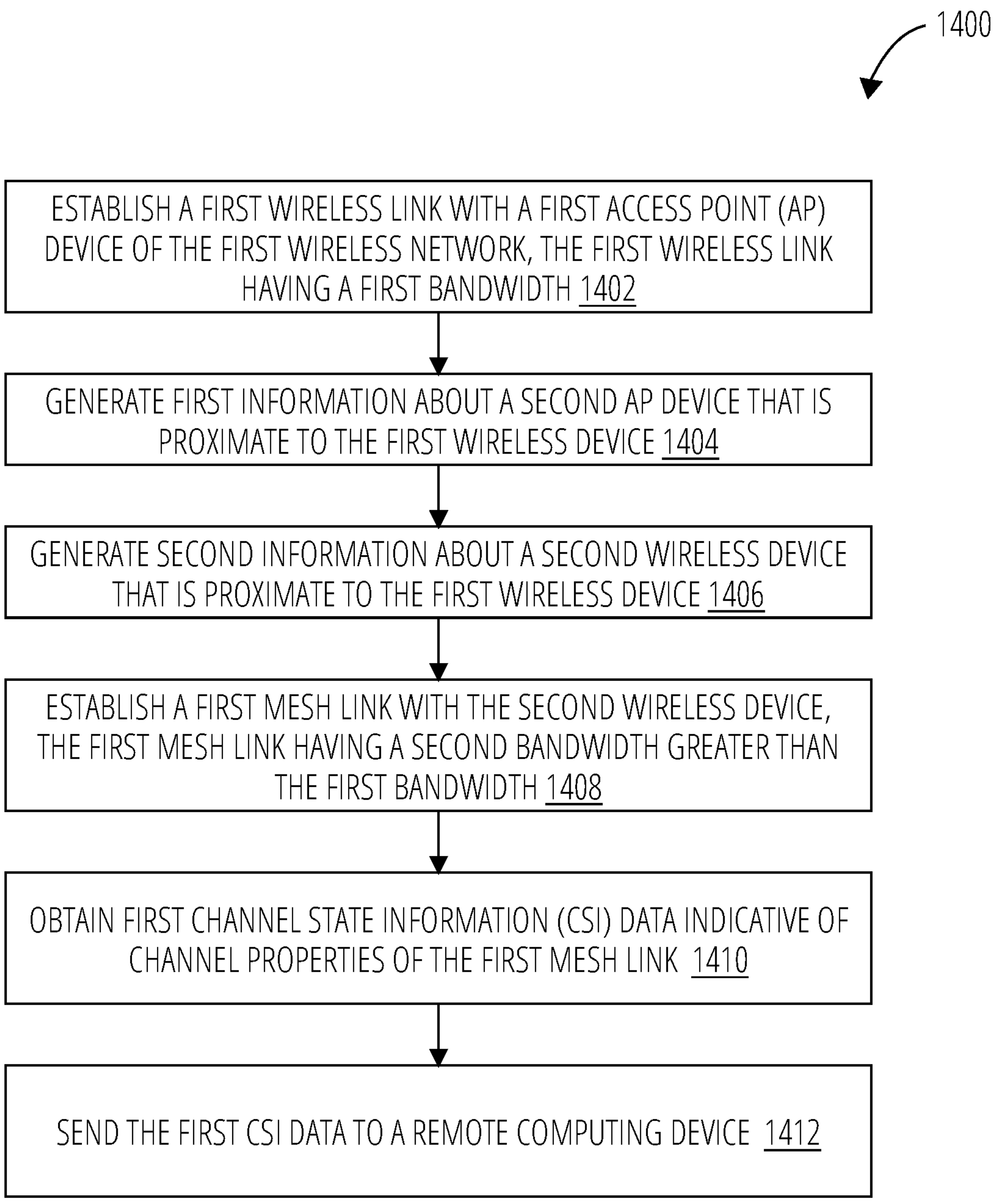
FIG. 14 is a flow diagram of a method of operating a first wireless device that is part of a first wireless network according to at least one embodiment.

FIG. 14 is a flow diagram of a method 1400 of operating a first wireless device that is part of a first wireless network according to at least one embodiment. The method 1400 may be performed by processing logic that may comprise hardware (e.g., circuitry, dedicated logic, programmable logic, microcode, etc.), software (such as instructions running on the processor), firmware, or a combination thereof. In one embodiment, any wireless device described herein can perform the method 1400. In another embodiment, a station (or a client device) can perform the method 1400. In at least one embodiment, one or more processors perform the method 1400. Alternatively, other components of disclosed devices may perform some or all of the operations of the method 1400.

With further reference to FIG. 14, method 1400 may begin with the processing logic establishing a first wireless link with a first AP device of a first wireless network (block 1402). The first wireless link has a first bandwidth (e.g., 20 MHz, 40 MHz, or the like). The processing logic can perform a scan to find any AP devices and wireless devices near the first wireless device. At block 1406, the processing logic generates first information about a second AP device that is proximate to the first wireless device. At block 1408, the processing logic generates second information about a second wireless device that is proximate to the first wireless device. At block 1410, the processing logic establishes a first mesh link with the second wireless device, the first mesh link having a second bandwidth greater than the first bandwidth. At block 1412, the processing logic obtains first CSI data indicative of channel properties of the first mesh link. At block 1414, the processing logic sends the first CSI data to a remote computing device. As described herein, the remote computing device can have an ML model trained to detect a presence or motion of a user.

In a further embodiment, the second wireless device is a Type-1 device connected to the first AP device or a second AP device. In at least one embodiment, the processing logic can receive a command to form a WLAN mesh network using a channel. The command can be one of a sequence of commands sent sequentially to the stations in the home wireless network. The WLAN mesh network can be a mesh network that is compliant with the IEEE 802.11s standard. The processing logic can establish a second mesh link with a third wireless device that is proximate to the first wireless device. The second mesh link can be on the channel and have a second bandwidth (e.g., 80 MHz), the second bandwidth greater than the first bandwidth. The second bandwidth can be greater than 40 MHz, in some embodiments. In other embodiments, the second bandwidth can be less than 40 MHz when there are no higher bandwidths available. The accuracy may be less than if higher bandwidths are used. Also, in some cases, some of the links can be more than 40 MHz, and some of the links can be greater than 40 MHz. Similarly, the first mesh link can be on the channel and have the second bandwidth. The higher bandwidth can be used for CSI sensing applications. The first and second mesh links can be established in response to the command. The processing logic can establish any additional mesh links with other wireless devices that are proximate to the first wireless device. The processing logic can obtain second CSI data indicative of channel properties of the second mesh link (and any additional mesh links) and send the second CSI data to the remote computing device.

In at least one embodiment, the processing logic can receive information from a centralized controller. The information can identify the first wireless device as a leader of a WLAN mesh network and a channel for the WLAN mesh network. The first mesh link can be established on the same channel as described herein. The processing logic can establish one or more additional mesh links with one or more stations found in the scan. The processing logic can obtain additional CSI data indicative of channel properties of the one or more additional mesh links. The processing logic can send the additional CSI data to the remote computing device.

In at least one embodiment, the processing logic can establish a second wireless link with the second AP device on a channel before obtaining the first CSI data. In at least one embodiment, the second wireless link and the first mesh link are established on the same channel.

In at least one embodiment, the processing logic receives information from a centralized controller. The information can identify a channel for a WLAN mesh network. The processing logic can establish a second wireless link with the second AP device on the channel. The second wireless link and the first mesh link can be established on the same channel. The processing logic can establish one or more additional mesh links with one or more wireless devices that are proximate to the first wireless device. The processing logic can obtain additional CSI data indicative of channel properties of the one or more additional mesh links. The processing logic can send the additional CSI data to the remote computing device.

As described herein, in addition to the CSI data obtained from the mesh links, in some cases, the processing logic can obtain CSI data indicative of channel properties of the first wireless link between the first station and the home AP device. The processing logic can send this CSI data to the remote computing device. In this case, the first bandwidth of the first wireless link can be adequate for CSI sensing. The CSI data from the mesh links can improve the accuracy of the CSI sensing applications.

Mesh Formation Scenarios

There can be various scenarios where the mesh formation is successful and where mesh formation is unsuccessful. In one scenario, an STA could move to a 5 GHz channel selected by the mesh channel selection algorithm and connect to an AP device in that channel. The AP could reject the association and try to band-steer it to an optimal AP for the STA. In another scenario, the STAs connected to the same home AP/BSSID. A first STA and a second station STA are near each other, and the STAs form a mesh link on the same channel. In another scenario, the STAs are connected to the same home AP/BSSID first STA and second STA are far apart, and the first STA and second STA cannot form the mesh link on the same channel. In another scenario, the STAs are connected to different home AP devices in the same channel, the first STA and second STA are near to each other, and they stay connected to their respective AP devices, and the first STA and second STA form the mesh link on the same channel. In another scenario, the STAs are connected to different home AP devices in different channels, the second STA in a first AP device's range, the first AP device's channel is selected for mesh formation, the second STA connects to the first AP device, and the first STA and second STA form the mesh links in the first AP device's channel.

In another scenario where the second STA becomes a Type-2 node, the first AP device's channel is selected for mesh formation, but the second STA is not in range of the first AP device. The second STA moves to the first AP device's channel and forms a mesh link with the first STA. The second STA becomes a Type-2 node and will use the first STA for Internet/LAN access.

In another scenario where a Type-2 node is behind another Type-2 node, the first AP device's channel is selected for mesh formation (the second AP device is in the 2.4 GHz channel). The second STA and third station are not in the range of the first AP device. The second STA can form a mesh link with the first STA and become a Type-2 node. The third STA is not in range of the first STA and can only form a mesh link with the second STA. Allowing a Type-2 node behind a Type-2 node could adversely impact the network performance of all nodes in the channel. So, the mesh formation can be aborted due to this reason. The second STA and third STA can continue to be connected to the second AP device.

In another scenario where there are multiple Type-2 nodes behind a Type-1 node, the first AP device's channel is chosen for mesh formation (the second AP device is in the 2.4 GHz channel). The second STA and third STA are not in the range of the first AP device. The second STA and third STA are in the range of the first STA (potential Type-1) and can form a mesh link with it. Supporting multiple Type-2 nodes can drain resources (e.g., CPU, Memory, etc.) of Type-1 nodes (first STA). As such, the mesh formation can be aborted due to this reason. The second STA and third STA can continue to be connected to the second AP device.

Figure 15A:
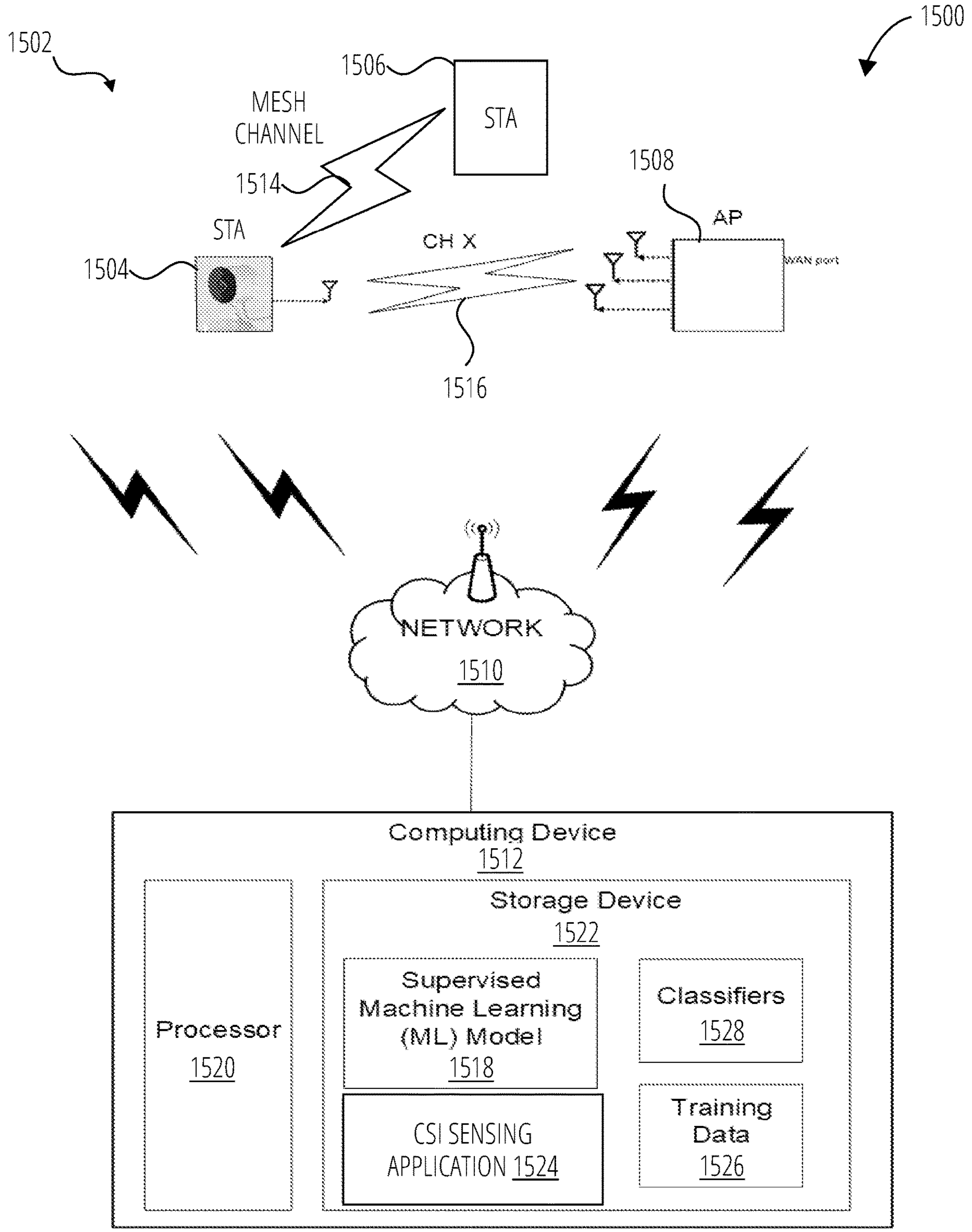
FIG. 15A is a block diagram of a system for detecting the presence of a human using wireless signals in a wireless local area network, according to at least one embodiment.

FIG. 15A is a block diagram of a system 1500 for detecting the presence of a human using wireless signals in a wireless local area network 1502, according to at least one embodiment. The system 1500 may include a wireless detector 1504 and wireless detector 1506, at least AP device 1508 that includes a transmitter of wireless signals, a network 1510 (e.g., WLAN, a wide area network (WAN), or cellular), and a computing device 1512. The wireless detector 1504, a WLAN receiver, may be located in a room (or other space) in or near a building to detect the presence associated with the room (or other space). The wireless detector 1506, a WLAN receiver, may be in the room. The AP device 1508, a WLAN transmitter, may transmit wirelessly over multiple channels, at least one of which is received by a receiver within the wireless detector 1504. The AP device 1508 may be in the same room or a different room than the wireless detector 1504 and 1506.

In various embodiments, the wireless detector 1504 can establish a mesh link 1514 (of a WLAN mesh network) with the wireless detector 1506, in addition to being part of the wireless local area network 1502. The wireless detector 1504 can receive the first data indicative of channel properties of the mesh link 1514 between the wireless detector 1504 and the wireless detector 1506. The wireless detector 1504 may receive second data indicative of channel properties of a communication link 1516 between the wireless detector 1504 and the AP device 1508. The wireless detector 1504 (or some remote device to which the first data and/or second data is transmitted) may classify the first data (and/or the second data) to determine whether a human presence has been detected. This classification, as mentioned, may be performed using a trained machine learning (ML) model 1518, such as a support vector machine (SVM) model, a neural network (NN) model, or another trained ML model. In at least one embodiment, the wireless detector 1504 can send the first data (and/or the second data) to the computing device 1512, located in a cloud across the network 1510. The computing device 1512 may perform the initial training of the supervised ML model 1518 to detect the presence of a human using wireless signals in the WLAN mesh network established by the wireless detector 1504, and optionally wireless signals in the wireless local area network 1502. The computing device 1512 may include, for example, a processor 1520 and a storage device 1522. The storage device 1522, which may be understood to include computer memory and/or storage, may include the supervised ML model 1518 (e.g., code for execution of the supervised ML model), and CSI sensing application 1524, training data 1526, and pre-trained classifiers 1528, which may be used in performing detection and location identification of persons within buildings. The pre-trained classifiers 1528 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. In one embodiment, a classifier for a human may be trained to recognize human movement as distinguished from the movement of pets or curtains.

The training data 1526 may later be updated over time as people come and go through the room, and the data captured at the wireless detector 1504 (and at other wireless detectors and receivers) within the building may include additional data, including channel properties, captured during periods of time in which the room may change, and particularly with reference to detecting people moving within the room. This updated training data may then be used to further train the pre-trained classifiers 1528 so that further presence detection may be improved. In at least one embodiment, the ML model 1518 can be deployed on one of the devices of the wireless local area network 1502. For example, an updated supervised ML model 1518 may be transmitted periodically by the computing device 1512, the AP device 1508 (or to a remote second device) used to perform classification to determine human presence in the future.

Employing trained ML models to perform presence detection may be performed on different types of channel property data, including RSSI data, CSI data, or a combination of both. Additional sources of signal characteristics, power, channel properties, or other channel information may also be employed, and therefore, RSSI data and CSI data are but a listing of understood and available forms of channel properties.

Accordingly, in one embodiment, the wireless detector 1502 may receive and transmit RSSI, which is a parameter (e.g., channel properties) that has a value of zero ("0") to an RSSI maximum value (referred to as "RSSI Max") and is indicative of the signal strength of a wireless signal associated with the mesh link 1514. Accordingly, RSSI is a measurement value of power present in received wireless signals and contains a single value per packet. For example, RSSI can be measured as the power level of a radio frequency that a client device receives from an access point, such as a wireless router. In another implementation, RSSI may be a measurement of the energy observed at the antenna by a wireless PHY of the receiver used to receive a current PPDU of the receiver. In one implementation of a home WLAN (e.g., using the Wi-Fi® technology), for example, the wireless detector 1502 may generate the RSSI either based on a data frame received or a beacon from an AP node. The RSSI may fluctuate when the environment changes. Such changes can be caused by many factors, such as moving a transmitter or receiver, moving objects nearby the AP or client, changing ambient noise levels, temperature swings, or other factors that cause fluctuations in RSSI.

In another embodiment or implementation, the wireless detector 1502 may measure and transmit CSI data that includes channel properties of a communication link between a transmitter and a receiver. For example, a receiver within the wireless detector 1502 may retrieve the CSI from a baseband channel estimator to perform presence detection. The receiver may adjust the rate of sampling channel properties by the baseband channel estimator. The CSI data may include a detailed channel impulse response with amplitude and phase information across all the OFDM subcarriers and be updated (at the maximum rate) with every OFDM symbol. This may provide more information about the environment under surveillance and thus may improve detection capability when applying a trained ML model 1518, as discussed herein, to CSI data or CSI-liked data.

As described above, CSI-based motion detectors work based on disruption to the channel state information and the multipath effects of WLAN transmission between AP devices, smart speakers, streaming devices, etc.

Figure 15B:
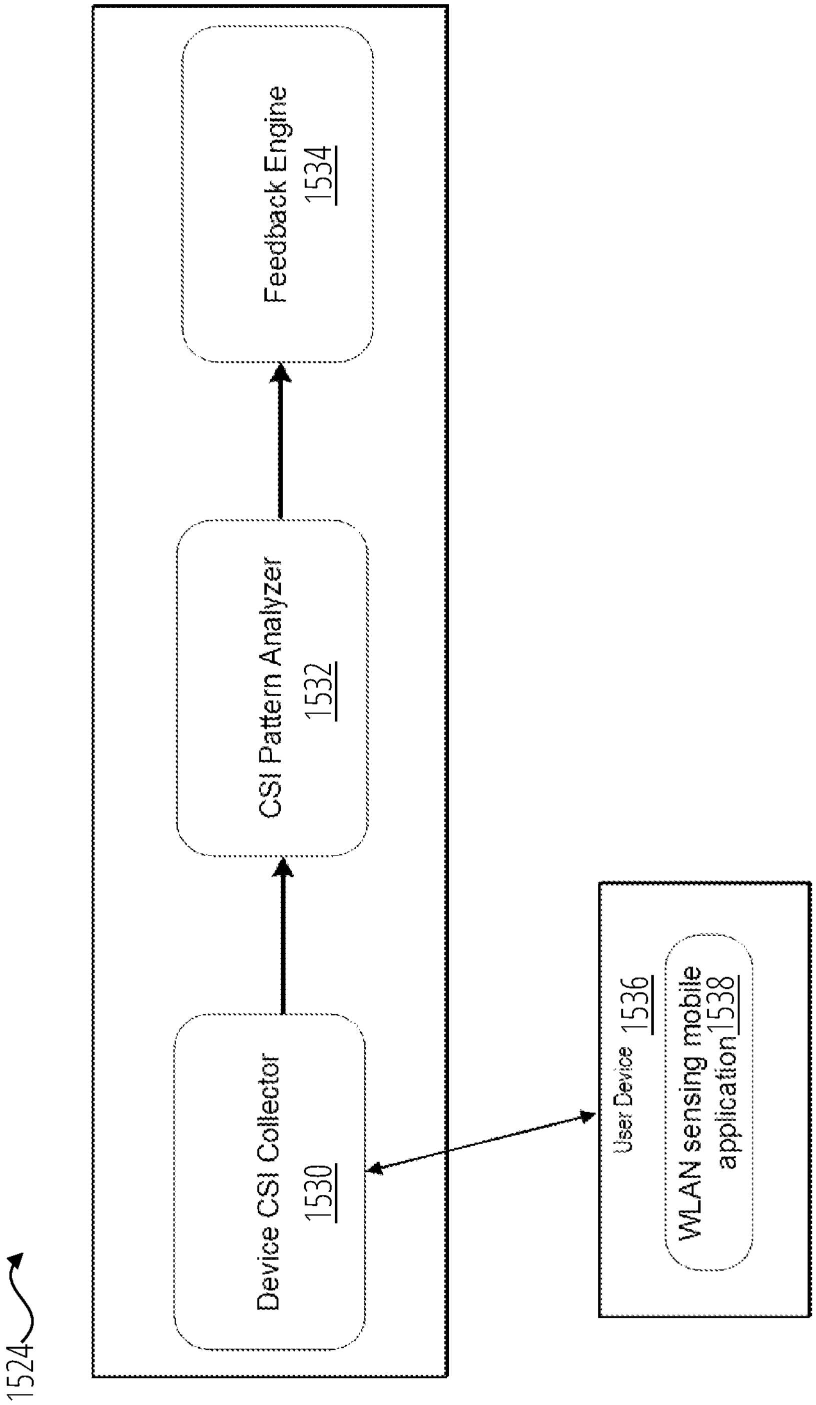
FIG. 15B is a block diagram of a CSI sensing application according to at least one embodiment.

FIG. 15B is a block diagram of a CSI sensing application 1524, according to at least one embodiment. The CSI sensing application 1524 for CSI-based sensing includes three main software components: device CSI collector 1530, CSI pattern analyzer 1532, and feedback engine 1534. The device CSI collector 1530 collects data from one or more devices in a WLAN network, and the CSI pattern analyzer 1532 can be used to validate the placement of one or more devices in geographic locations to optimize the performance of the WLAN. The device CSI collector 1530 operates in connection with a WLAN sensing mobile application 1538 (also referred to as a companion app) on a user device 1536. The WLAN sensing mobile application user device 1536 can help guide a user in placing devices and testing the placement of the devices for motion and no-motion conditions. The device CSI collector 1530 collects the data during the testing, and the CSI pattern analyzer 1532 analyzes the placement of the devices based on the collected CSI data to optimize performance. Based on the decision made by CSI pattern analyzer 1532, the feedback engine 1534 communicates the decision to the end customer through the WLAN sensing mobile application 1538. The WLAN sensing mobile application 1538 can have instructions for the user to perform the local training to fine-tune the ML model for optimal performance.

In at least one embodiment, the device CSI collector 1530 can cause the WLAN sensing mobile application 1538 to prompt a user for a device placement routine when enabling this feature for the first time. The device CSI collector 1530 or the WLAN sensing mobile application 1538 can cause the devices being placed to be initially configured in a setup mode in which CSI data can be collected. The WLAN sensing mobile application 1538 can provide a user interface to allow the user to input "motion" or "no motion" ground truth information for the CSI pattern analyzer 1532.

The device CSI collector 1530 can collect RF channel properties (e.g., CSI) of the mesh link 1514 between the wireless detector 1502 and wireless detector 1504. The device CSI collector 1530 can collect RF channel properties (e.g., CSI) of the communication link 1516 between the wireless detector 1502 and the AP device 2206. The device CSI collector 1530 can collect RF channel properties of one or more channels between one or more devices in the wireless local area network 1502. The device CSI collector 1530 can receive the RSSIs, CSI data, or the like from a wireless device that collects this data, as described below with respect to FIG. 15C.

Figure 15C:
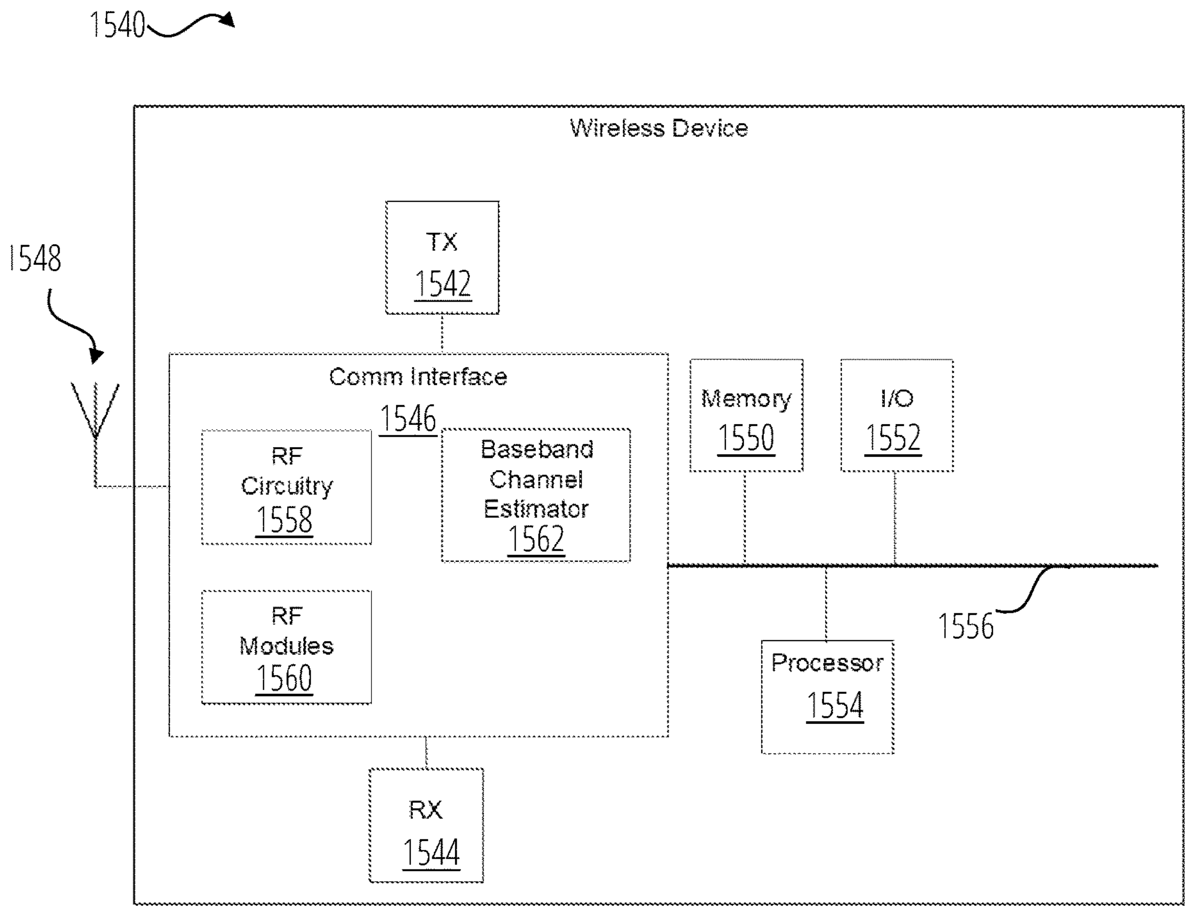
FIG. 15C illustrates a wireless device adapted to detect and transmit channel state information (CSI) or receive signal strength indicator (RSSI) data useable by the CSI sensing application and a supervised machine learning model to perform presence detection, according to at least one embodiment.

FIG. 15C illustrates a wireless device 1540 adapted to detect and transmit CSI or RSSI data useable by the CSI sensing application 1524 and a supervised machine learning model to perform presence detection, according to at least one embodiment. Accordingly, the wireless device may represent the wireless detector 1502, wireless detector 1504, or the AP device 1508 in different embodiments. The wireless device 1540 may include, but not be limited to, a transmitter (TX) 1542 (e.g., a WLAN transmitter), a receiver (RX) 1544 (e.g., a WLAN receiver), a communication interface 1546, one or more antenna(s) 1548, a memory device 1550, one or more input/output (I/O) devices 1552, and a processor 1554. These components may all be coupled to a communications communication bus 1556. The memory device 1550 may include storage in which to store the supervised ML model 1518, e.g., an SVM or a NN model, the WLAN sensing mobile application 1538, or other software components that can perform some of the operations described herein.

In one embodiment, the receiver 1544 receives the first data indicative of channel properties of a first mesh link between the wireless device 1540 and a wireless transmitter in another device, such as wireless detector 1506 or AP device 1508, both of which are located in a building. In one embodiment, the processor 1554 may be configured to direct the TX 1542 to transmit the first data, which includes the channel properties, to a remote computing device (e.g., the computing device 1512) over the network 1510 for supervised ML processing. The processor 1554 may further be configured to perform pre-processing of the first data and to classify the pre-processed first data as detecting either a stationary object (e.g., which may be known already to be stationary) or detecting a moving object such as a human, as described herein. In various embodiments, the I/O device(s) 1552 may include an input device, such as a microphone, and an output device, such as a speaker.

The antennas (such as the antenna(s) 1548) described herein within various devices may be used for Long Term Evolution (LTE) frequency bands, third generation (3G) frequency bands, Wi-Fi® and Bluetooth® frequency bands, or other WLAN frequency bands, including Zigbee®, Z-Wave™ or the like, wide area network (WAN) frequency bands, global navigation satellite system (GNSS) frequency bands such as global positioning system (GPS) frequency bands, or the like.

As illustrated in FIG. 15C, the communication interface 1546 may further include RF circuitry 1558, a set of RF modules 1560, and a baseband channel estimator 1562. In one embodiment, one of the RF modules 1560 may include a Wi-Fi® PHY at which the RF energy of received RF signals may be measured for purposes of RSSI. The baseband channel estimator 1562, by virtue of being incorporated within the communication interface 1546, may be coupled to the antenna(s) 1548, the TX 1542, and the RX 1544 and be adapted to estimate the CSI (or the RSSI) for each channel. As discussed, the CSI includes a detailed channel impulse response (e.g., containing channel properties) with amplitude and phase information across all the OFDM subcarriers and is updated (at the maximum rate) with every OFDM symbol. This provides more information about the environment under surveillance and thus provides excellent detection capability when applying a supervised ML model to CSI data.

The wireless device 1540 may, in various embodiments, continuously upload RSSI or CSI data to the computing device 1512 (FIG. 15A) for use in supervised ML model processing or may buffer the RSSI or CSI data in the memory device 1550 (or other computer storage) and then periodically upload the RSSI or CSI data at a predetermined time interval. This data may allow the computing device 1512 to perform updates to the training of the supervised ML model 1518. In one embodiment, the wireless device 1540 (or a co-located computing system) is adapted to include sufficient memory, storage, and processor power to directly perform pre-processing and classification with the supervised ML model 1518 discussed herein.

In some embodiments, the wireless device 1540 (or co-located computing system) may contain sufficient processing power to perform updates to the training of the supervised ML model 1518 and thus may work independently of access to cloud-based resources. These updates may be made using newly received data containing channel properties that confirm or fail to confirm the accuracy of the pre-trained classifiers 1528, which are trained as a part of the supervised ML model 1518.

Figure 16A:
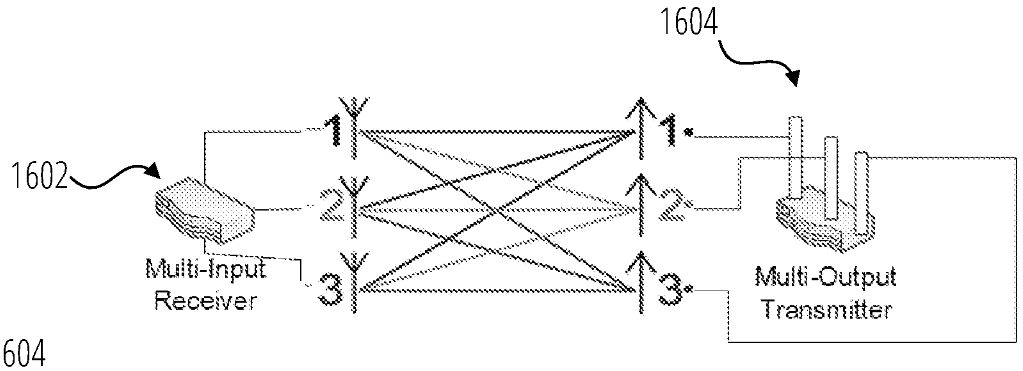
FIG. 16A is a block diagram of a multi-input receiver and a multi-output transmitter in communication, according to one embodiment, to represent how CSI operates.

FIG. 16A is a block diagram of a multi-input receiver 1602 and a multi-output transmitter 1604 in communication, according to one embodiment, representing how CSI operates. The standard Institute for Electrical and Electronics Engineers (IEEE) 802.11n was established in 2007 to boost the range and throughput of Wi-Fi® service. In IEEE 802.11n, multiple-in, multiple-out (MIMO) OFDM is used, and the physical layer presents a value to estimate the channel status in each subcarrier, e.g., the CSI for each subcarrier. The CSI may therefore be expressed as:

$$H=[h_{11}h_{12}\ldots h_{1N_r}h_{21}h_{22}\ldots h_{2N_r}\ldots H_{Nt1}H_{Nt2}\ldots h_{N_tN_r}],$$

where $$H(f_k)=|H(f_k)e^{j\varphi H(fk)}|$$

The term $H(f_k)$ represents the CSI value at the subcarrier level with frequency $f_k$. $|H(f_k)|$ denotes the amplitude and $\angle H(f_k)$ the phase in the subcarrier. The CSI describes how a signal propagates between the transmitter and the receiver device in amplitude and phase. The CSI also reveals the combined effect of scattering, fading, and power decay with respect to a distance of the received signals.

Figure 16B:
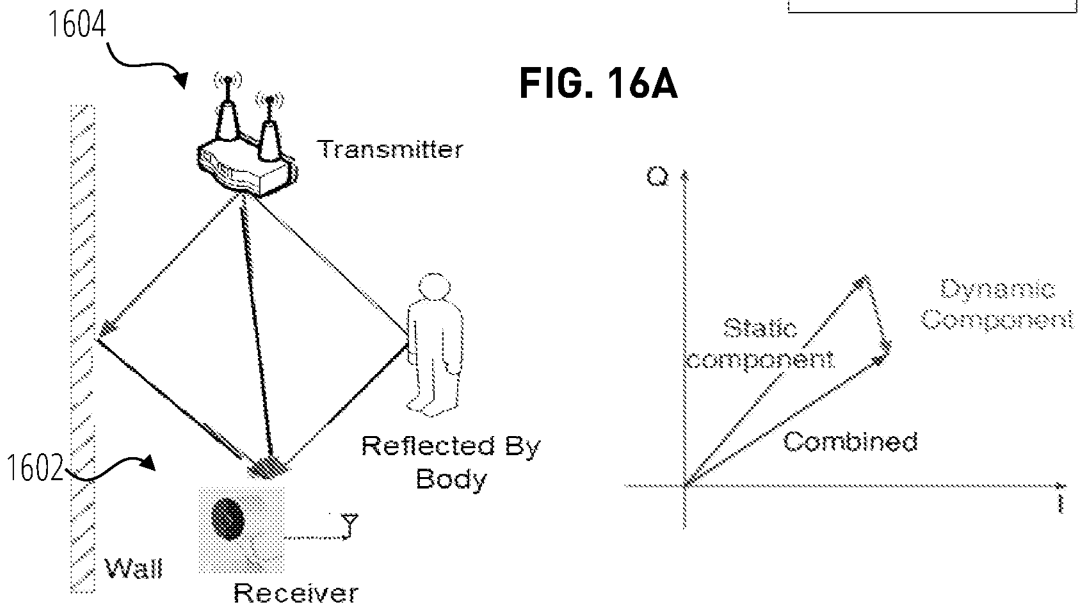
FIG. 16B is a reflection diagram of wireless signals between a transmitter 1604 and a receiver 1602 with a stationary human, according to one embodiment.

FIG. 16B is a reflection diagram of wireless signals between a transmitter 1604 and a receiver 1602 with a stationary human, according to one embodiment.

Figure 16C:
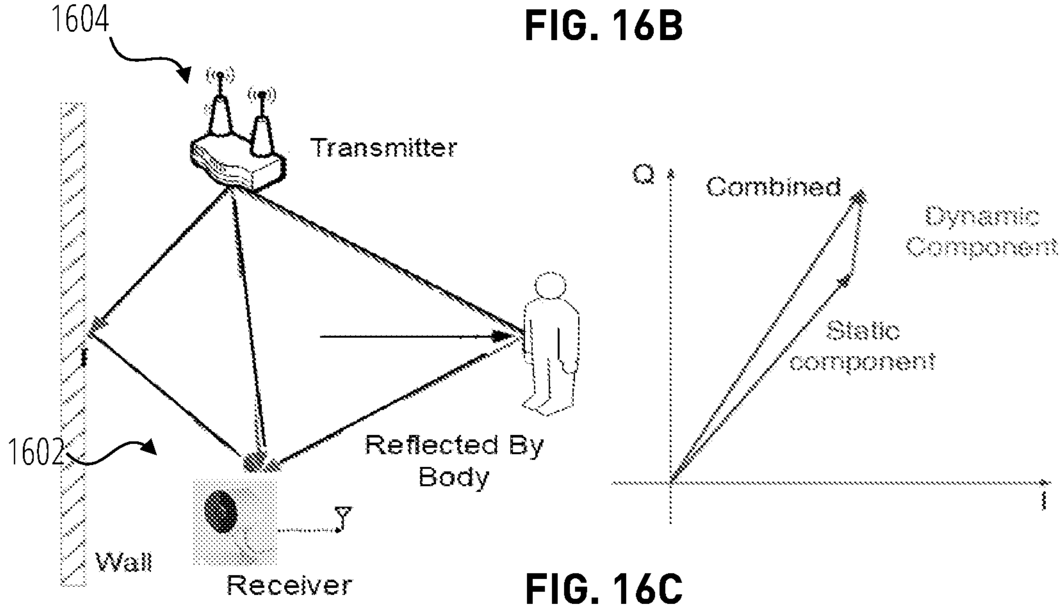
FIG. 16C is a reflection diagram of wireless signals between the transmitter and the receiver with a moving human (e.g., dk (t)), according to one embodiment.

FIG. 16C is a reflection diagram of wireless signals between the transmitter 1604 and the receiver 1602 with a moving human (e.g., dk (t)), according to one embodiment. In one example, the transmitter 1604 may be the multi-output transmitter 1604 (e.g., a second wireless device), and the receiver 1602 may be the multi-input receiver 1602 (e.g., a first wireless device).

The transmitter 1604 may transmit in many directions, including a line of sight (LoS) path as well as paths that reflect off of objections, such as a wall. Signal propagation may also be disturbed by human motion, and different motion activities may return different characteristics in the CSI data. In this way, machine learning may be used to classify the presence of humans. Equation (1) may depict the CSI data within a static channel, e.g., within a communication link without human movement. Equation (2) may detect the CSI data within a combination of a static channel and dynamic channel, where a portion of the CSI data indicates human movement.

$$H(f,t)=e^{-j2\pi\Delta ft}\sum_{k=1}^{N}a_k(f,t)e^{-j2\pi f\tau_k(t)} \tag{1}$$

$$H(f,t)=e^{-j2\pi\Delta ft}\left(H_s(f)+\sum_{k\in P_d}a_k(f,t)e^{-j\frac{2\pi d_k(t)}{\lambda}}\right) \tag{2}$$

where $H_x(f)$ in Equation (2) is the static channel component.

Figure 17:
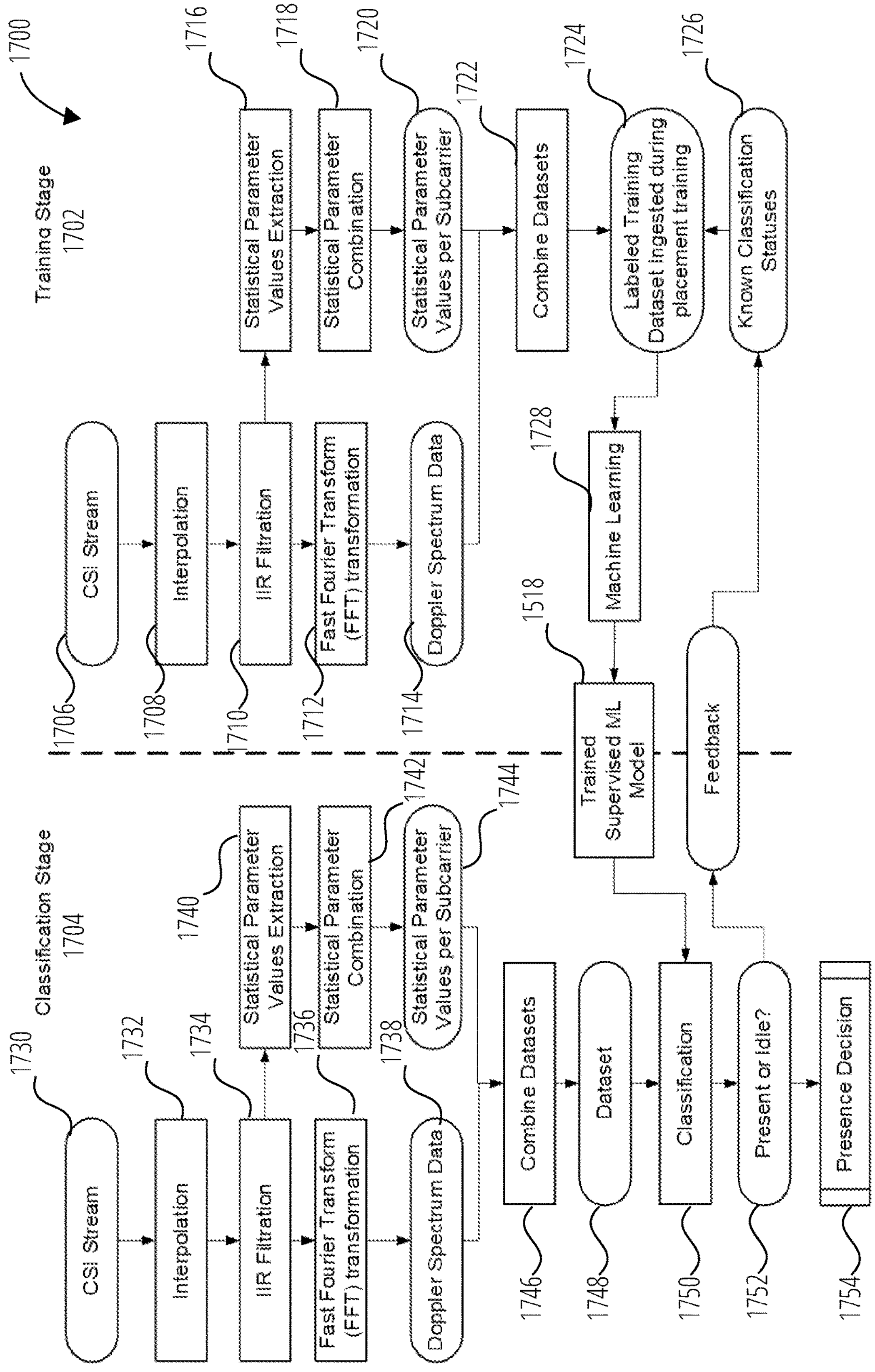
FIG. 17 is a flow diagram of a method including a training stage and a classification stage to train a supervised machine learning (ML) model and apply the trained ML model to classify pre-processed data to perform presence detection, according to various embodiments.

FIG. 17 is a flow diagram of a method 1700 including a training stage 1702 and a classification stage 1704 to, respectively, train a supervised machine learning (ML) model and to apply the trained ML model to classify pre-processed data to perform presence detection, according to various embodiments. Method 1700 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 1504, the computing device 1512, or the wireless device 1540 performs the method 1700. Alternatively, other components of a disclosed device may perform some or all of the operations of the method 1700.

With further reference to FIG. 17, the method 1700 may begin with the processing logic, within the training stage 1702, receiving initial data indicative of channel properties of a communication link between a wireless receiver (e.g., in the wireless detector 2202) and a wireless transmitter (e.g., in the AP device 1508) (block 1706). In one embodiment, the initial data is a CSI stream, but RSSI data may also be included. The initial data may be captured from a room within a building during an initial training phase used to train the supervised ML model 1518 before employing the supervised ML model for presence and motion detections.

The method 1700 may continue with the processing logic performing interpolation of the initial data to obtain interpolated data (block 1708). The interpolated data may include equidistant data points that embody the channel properties, e.g., to provide a smoothing effect to the initial data, e.g., CSI data. The method 1700 may continue with the processing logic filtering the interpolated data with an Infinite Impulse Response (IIR) filter to generate filtered data having reduced noise compared to the interpolated data (block 1710). Such an IIR filter may include feedback from an output of the IIR filter, which may therefore be known as a recursive digital filter. The filtering performed by the IIR filter may further include a non-linear phase characteristic. In other embodiments, another type of filter may be used. The interpolation and the filtering at blocks 1708 and 1710 may be performed to generate pre-processed data, and additional pre-processing steps are envisioned.

Given a complex-numbered CSI stream $h(k, t_n)$ for kth subcarrier index sampled at time $t_n$, the magnitude of $h(k, t_n)$ over time period T has N samples and can construct an $N_{sc}\times N$ matrix H.

$$H=\begin{bmatrix}|h(1,t_1)&\cdots&|h(t,t_N)|\\ \vdots&\ddots&\vdots\\ |h(N_{SC},t_1)|&\cdots&|h(N_{SC},t_N)|\end{bmatrix} \tag{3}$$

The matrix, H, of Equation (3) may include the interpolated and filtered data spanning various data points over time for the kth subcarrier index.

With continued reference to FIG. 17, the method 1700 may continue with the processing logic executing a Fast Fourier Transform (FFT) on the pre-processed data to generate a data stream in the frequency domain, e.g., that contains frequency domain information of the pre-processed data (block 1712). The fast FFT is a discrete Fourier transform algorithm that reduces the number of computations needed for N points from $2N^2$ to 2NlgN, where lg is the base-2 logarithm. In one embodiment, a one-dimensional FFT with Net points may be applied to each row of the matrix of Equation (3) to result in the following Doppler spectrum matrix, $H_{freq}$, given as Equation (4).

$$H_{freq} = \begin{bmatrix} |\tilde{h}(1, f_0)| & \cdots & |\tilde{h}(1, f_{N_{fft}-1})| \\ \vdots & \ddots & \vdots \\ |\tilde{h}(N_{SC}, f_0)| & \cdots & |\tilde{h}(N_{SC}, f_{N_{fft}-1})| \end{bmatrix} \tag{4}$$

where $\tilde{h}(k, f_n)$ is the $n^{th}$ frequency component for kth subcarrier index after FFT.

The data within the Doppler spectrum matrix may therefore be indicative of shifts in incoming received waves over a multipath channel. These shifts, in turn, indicate the movement of an object (e.g., a human) across time and space. For example, the $n^{th}$ reflected wave with amplitude (Cn) and phase (on) arrive from an angle (an) relative to the direction of movement of the human. The Doppler shift of this wave may be expressed as:

$$\Delta f_n = \frac{v}{\lambda}\cos\alpha_n \tag{5}$$

where v is the speed of the human that is moving. The data points within the Doppler spectrum matrix may therefore include the information for determining human presence based on reflected wireless signals from a moving human.

The method 1700 may continue with the processing logic extracting frequency components from the data stream in the frequency domain, e.g., the Doppler spectrum matrix, $H_{freq}$, which is indicative of the movement of a human, to generate Doppler spectrum data (block 1714). For example, in one embodiment, the frequency components of direct current (DC) and above 30 Hz may be dropped out to reduce the size of an input feature vector (discussed below), as only motion is useful information for classification. Then the matrix values may be stacked into a one-dimensional vector, as illustrated in Equation (6).

$$Y_{freq}=[|H(1,f_1)\} \ldots |h(1,f_{30Hz})| \ldots |h(N_{sc},f_1)| \ldots |h(N_{sc},f_{N_{fft}})|] \tag{6}$$

Additional reference will be made to this one-dimensional vector later.

With continued reference to FIG. 17, the method 1700 may continue with the processing logic extracting from the filtered data for the subcarrier statistical parameter values over a time period and within the time domain (block 1716). The statistical parameter values may include one or more of a maximum value, a minimum value, a mean value, a variance value, an entropy value, a mean cross rate value, a skewness value, or a kurtosis value, each of which is defined in more detail below. The method 1700 may continue with the processing logic combining these statistical parameter values into a second one-dimensional vector (block 1718) to generate a combined vector of the statistical parameter values for each subcarrier (block 1720). In another embodiment, the method 1700 generates statistical parameter values of the FFT results at block 1712 or block 1714.

The statistical parameter values may be useable as feature values to define the supervised ML model 1518, particularly in the case of an SVM model. More specifically, by combining the time-domain-based statistical parameter values as features, a machine learning classifier may more accurately separate new testing data in a hyper-dimensional plane. If the regularization technique is utilized to generate an SVM machine learning model, the contribution or weighting of these features may be emphasized or de-emphasized with hyper-parameters (e.g., statistical parameters per hyperplane for each subcarrier) to avoid the overfitting in the optimization process upon application of the supervised ML model 1518. Similarly, by combining the frequency-domain-based statistical parameter values as features, the machine learning classifier can more accurately separate new testing data in a hyper-dimensional plane.

In various embodiments, the maximum and minimum values per subcarrier may be the maximum and minimum values of the magnitude of complex CSI $h(k, t_n)$ over time period T. The mean value of $h(k, t_n)$ per subcarrier over the time period T may be defined as Equation (7):

$$\mu(k) = \frac{1}{N}\sum_{t_n \in T} |h(k, t_n)| \tag{7}$$

In one embodiment, the variance value per subcarrier may be defined as $$\text{var}(k) = \frac{1}{N-1}\sum_{N}[|h(k, t_n)| - \mu]^2 \tag{8}$$

where there are N samples for the time period T.

The magnitude of $h(k, t_n)$ over time period T may have N samples and can construct an $N_{sc} \times N$ matrix H like a two-dimensional image, given in Equation (9).

$$H = \begin{bmatrix} |h(1, t_1)| & \cdots & |h(1, t_N)| \\ \vdots & \ddots & \vdots \\ |h(N_{SC}, t_1)| & \cdots & |h(N_{SC}, t_N)| \end{bmatrix} \tag{9}$$

From the matrix, H, the processing logic may remove the stationary objects within the scene through the subtraction of the mean of sampled time period ($H_{mean}$) and normalize the data to a grayscale image (all entries are between 0 and 1) $I_{gray}$.

In one embodiment, the processing logic CSI entropy value may be computed with the formula of the image entropy.

$$\text{Entropy} = -\sum_{All\,(m,n)} I_{gray}(m, n) * \log_2(I_{gray}(m, n)) \tag{10}$$

where (m,n) is the entry of the $m^{th}$ row and $n^{th}$ column of the grayscale image. The mean cross rate value per subcarrier may count the number of crossings (in the positive direction) of $h(k, t_n)$ through the mean valued μ for the specified time period, T.

Skewness is a measure of the asymmetry of the data around the sample mean. If skewness is negative, the data are spread out more to the left of the mean than to the right. If skewness is positive, the data are spread out more to the right. The skewness value of the normal distribution (or any perfectly symmetric distribution) is zero.

In one embodiment, therefore, the skewness feature per subcarrier may be defined as expressed in Equation (11).

$$s(k) = \frac{\frac{1}{N}\sum_{N}[|h(k, t_n)| - \mu]^3}{\left\{\sqrt{\frac{1}{N}\sum_{N}[|h(k, t_n)| - \mu]^2}\right\}^3} \tag{11}$$

Kurtosis is a measure of how outlier-prone a distribution is of a dataset. The kurtosis value of the normal distribution is three. Distributions that are more outlier-prone than the normal distribution have a kurtosis value greater than three, e.g., distributions that are less outlier-prone have kurtosis values less than three. Kurtosis may be expressed by the following Equation (12).

$$Kr(k) = \frac{\frac{1}{N}\sum_{N}[|h(k, t_n)| - \mu]^4}{\left\{\frac{1}{N}\sum_{N}[|h(k, t_n)| - \mu]^2\right\}^2} \tag{12}$$

With continued reference to FIG. 17, the method 1700 may continue with the processing logic combining (e.g., stacking) the feature values (within the second vector) with the Doppler spectrum data (within the first vector) within a one-dimensional (1D) resultant vector, e.g., one-dimensional vector (block 1722). The method 1700 may continue with the processing logic labeling the data points within the 1D resultant vector with known classification statuses (block 1724) to generate a labeled training dataset that can be ingested. The labeled training dataset may continue to be updated through future feedback from the classification stage 1704 (block 1726). The method 1700 may continue with the processing logic performing supervised machine learning using the labeled training dataset to generate a trained supervised machine learning model (block 1728). The trained supervised ML model 1518 may then be applied during classification stage 1704, as will be explained.

In various embodiments, the training stage 1702 may be performed offline, e.g., by the computing device 1512 within the cloud. The method blocks block 1706 through block 1724 may be referred to as data pre-processing, e.g., the preparation of the CSI stream for machine learning according to a supervised ML model such as support vector machines (SVM) or other classification-based or regression-based learning models.

In machine learning, support vector machines (SVMs, also support vector networks) are supervised learning models with associated learning algorithms that analyze data used for classification and regression analysis. Given a set of training examples, each marked as belonging to one or the other of at least two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. When data are not labeled, supervised learning is not possible, and an unsupervised learning approach may instead be employed, which attempts to find natural clustering of the data to groups, and then AP devices new data to these formed groups. The clustering algorithm that provides an improvement to the SVMs is called support vector clustering and is used in industrial applications either when data are not labeled or when only some data are labeled as preprocessing for a classification pass.

With continued reference to FIG. 17, the method 1700 may continue with the processing device, within the classification stage 1704, receiving first data indicative of channel properties of the mesh link between a wireless receiver (e.g., in the wireless detector 1504) and a wireless transmitter (e.g., in the wireless detector 1506) (block 1730). In one embodiment, the first data is a CSI stream, but RSSI data may also be included. This "first" data may be data received in real-time and for which a presence detection is to be performed with reference to the room in the building. The method 1700 may also be extended to cover additional rooms within the building. As will be apparent, the pre-processing steps within the classification stage 1704 match those performed during the training stage 1702; accordingly, detailed explanations will not be repeated with reference to the latter.

The method 1700 may continue with the processing logic performing interpolation of the first data to obtain interpolated data (block 1732). The interpolated data may include equidistant data points that embody the channel properties, e.g., to provide a smoothing effect to the first data. The method 1700 may continue with the processing logic filtering the interpolated data with an infinite impulse response (IIR) filter to generate filtered data having reduced noise compared to the interpolated data (block 1734).

With continued reference to FIG. 17, the method 1700 may continue with the processing logic executing an FFT on the filtered data to generate a data stream in the frequency domain (block 1736). The method 1700 may continue with the processing logic extracting frequency components from the data stream in the frequency domain, e.g., the Doppler spectrum matrix, $H_{freq}$, which is indicative of the movement of a human, to generate Doppler spectrum data (block 1738). The frequency components may include data points located between DC and approximately 30 Hz.

The method 1700 may continue with the processing logic extracting from the filtered data for the subcarrier, statistical parameter values over a time period, and within the time domain (block 1740). The statistical parameter values may include one or more of a maximum, a minimum, a mean, a variance, entropy, a mean cross rate, skewness, or kurtosis, each of which was defined above. The method 1700 may continue with the processing logic combining these statistical parameter values into a one-dimensional vector (block 1742) to generate a combined vector of the statistical parameter values for each subcarrier, where the statistical parameter values are useable as features values to define the supervised ML model (block 1744). The method 1700 may continue with the processing logic stacking the statistical parameter values with the Doppler spectrum data within a one-dimensional (1D) resultant vector, e.g., a larger one-dimensional vector containing the feature values (block 1746), to generate a dataset for the supervised ML model 1518 that includes both time domain and frequency domain values (block 1748). For example, the method 1700 may stack the variance with the Doppler spectrum according to Equation (14). Similarly, other statistical parameters from Equation (5)-(13) may be stacked to obtain a larger-size feature vector for ML.

$$Y_{feature}=[|\tilde{h}(1,f_1)| \ldots |\tilde{h}(1,f_{30Hz})| \ldots |\tilde{h}(N_{sc},f_1)| \ldots |\tilde{h}(N_{sc},f_{N_{fft}})| \mathrm{var}(1) \ldots \mathrm{var}(N_{sc}) \tag{14}$$

With continued reference to FIG. 17, the method 1700 may continue with the processing device classifying, via execution of the trained supervised ML model (block 1750), data of the dataset to distinguish the movement within the building from stationary objects (block 688), which results in a presence detection or detection of idle channels (block 1752). The presence detection may be indicative of the presence of a human. In another embodiment, the results can be motion detection or non-motion detection. In one embodiment, the pre-processing of blocks 1730-1748 is skipped. While skipping the inclusion of time-domain statistical parameters may create a less rich dataset, such a simplified embodiment may still be employed, and thus, the classification may be performed on the Doppler spectrum data (instead of the dataset) using the supervised ML model.

The method 1700 may continue with the processing logic outputting a presence decision with reference to at least a portion of the incoming CSI stream (block 1752). In one embodiment, the presence decision is binary, e.g., "presence detected" or "presence not detected," although, in other embodiments, the decision may be indicated with a non-binary value. As discussed in further detail, a plurality of presence decisions may be output over a shifting time window to avoid a false-negative detection.

In another embodiment, assuming a number of receiver-transmitter links, Nrt and a number of subcarriers, $N_{SC}$, then a CSI vector is a complex vector of length $N_{SC}$ along a link between a receiver and a transmitter. Only the magnitude of the complex entries in the vector can be considered. A CSI capture is a matrix obtained by stacking the CSI vectors along all the links. Denote the ith capture by $H_i$. Then $H_i$ is a matrix of size $N_{SC}\times$Nrt. Also, denote the ith CSI vector along link l by $H_{i:l}$. and the sequence of CSI vectors along link l by $H_i$. Overall, $H_{i:l}$ is a 3D tensor of size $I\times N_{SC}\times$Nrt.

From the sequence of CSI vectors Hit, the processing logic constructs a sequence of CSI frames $X_{i:l}$ by sliding a window 712 of a fixed size and a fixed stride along the sequence of CSI vectors along each link. It should be noted that the ith CSI frame along link l, $X_{i:l}$ is a matrix with $N_{SC}$ rows and the number of columns equal to the length of the sliding window. The (j, k)th element of this matrix is given by $X_{i:l}$(j, k).

In at least one embodiment, the statistic parameter values used to validate a CSI frame can include the following equations for the temporal mean along the ith subcarrier (equations (15)-(17)):

$$\mu_{u,j}(j) = \frac{\sum_k X_{i,l}(j,k)}{\text{sliding window size}} \tag{15}$$

The temporal variation along the jth subcarrier (16):

$$\sigma^2_{i,j}(j) = \frac{\sum_k (X_{i,l}(j,k) - \mu_{i,l})^2}{\text{sliding window size}} \tag{16}$$

The temporal variation along the jth subcarrier (16):

$$\sigma^2_{i,l}(j) = \frac{\sum_k (X_{i,l}(j,k) - \mu_{i,l})^2}{\text{sliding window size}} \tag{17}$$

In another embodiment, the preprocessing of a CSI frame can include subcarrier spacing, subcarrier (spatial) normalization, temporal normalization, 2D FFT plus shifting and log transform, cropping the temporal dimension, and removing the first and last few columns. 1

Figure 18:
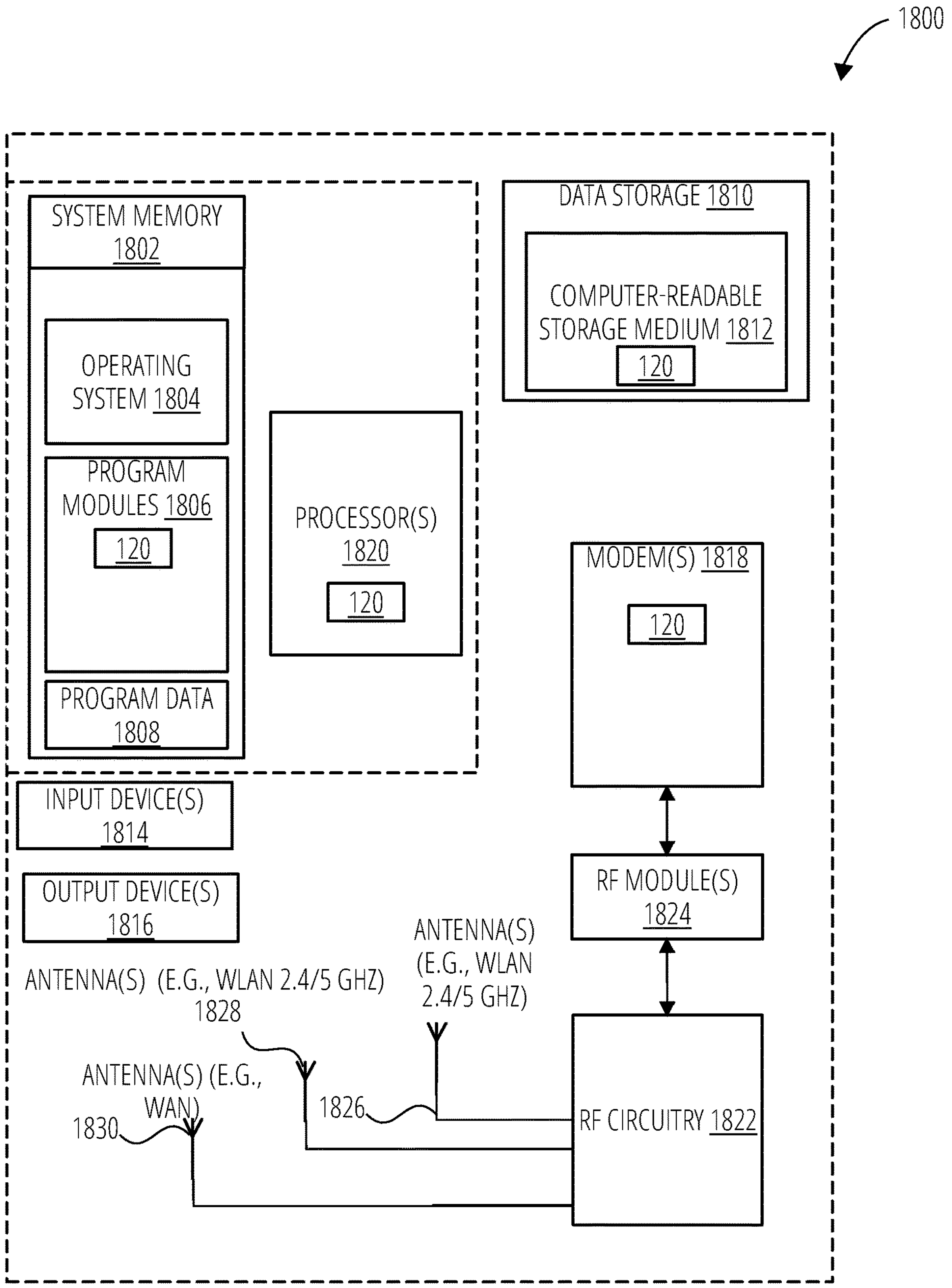
FIG. 18 is a block diagram of a wireless device for forming and using a WLAN mesh network in a wireless network according to one embodiment.

FIG. 18 is a block diagram of a wireless device 1800 for forming and using a WLAN mesh network in a wireless network according to one embodiment. The wireless device 1800 may correspond to the mesh network devices described above with respect to FIG. 1A to FIG. 17. Alternatively, the wireless device 1800 may be other electronic devices, as described herein.

The wireless device 1800 includes one or more processor(s) 1820, such as one or more central processing units (CPUs), microcontrollers, field-programmable gate arrays, or other types of processors. The wireless device 1800 also includes system memory 1802, which may correspond to any combination of volatile and/or non-volatile storage mechanisms. The system memory 1802 stores information that provides operating system component 1804, various program modules 1806, program data 1808, and/or other components. In one embodiment, the system memory 1802 stores instructions of methods to control the operation of the wireless device 1800. The wireless device 1800 performs functions by using the processor(s) 1820 to execute instructions provided by the system memory 1802. In one embodiment, the program modules 1806 may include the mesh network logic 120 described herein. The mesh network logic 120 may perform some of the operations of forming and using a WLAN mesh network as described herein.

The wireless device 1800 also includes a data storage device 1810 that may be composed of one or more types of removable storage and/or one or more types of non-removable storage. The data storage device 1812 includes a computer-readable storage medium 1812 on which is stored one or more sets of instructions embodying any of the methodologies or functions described herein. Instructions for the program modules 1806 (e.g., mesh network logic 120) may reside, completely or at least partially, within the computer-readable storage medium 1812, system memory 1802, and/or within the processor(s) 1820 during execution thereof by the wireless device 1800, the system memory 1802 and the processor(s) 1820 also constituting computer-readable media. The wireless device 1800 may also include one or more input device(s) 1814 (keyboard, mouse device, specialized selection keys, etc.) and one or more output device(s) 1816 (displays, printers, audio output mechanisms, etc.).

The wireless device 1800 further includes one or more modem(s) 1818 to allow the wireless device 1800 to communicate via wireless connections (e.g., such as provided by the wireless communication system) with other computing devices, such as remote computers, an item providing system, and so forth. The modem(s) 1818 can be connected to one or more radio frequency (RF) modules 1824. The RF modules 1824 may be a WLAN module, a WAN module, a wireless personal area network (WPAN) module, a GPS module, or the like. The antenna structures (antenna(s) 1826, 1828, 1830) are coupled to the Rf circuitry 1822, which is coupled to the modem(s) 1818. The Rf circuitry 1822 may include radio front-end circuitry, antenna switching circuitry, impedance matching circuitry, etc. The antenna(s) 1826, 1828, 1830 may be GPS antennas, Near Field Communications (NFC) antennas, other WAN antennas, WLAN or PAN antennas, or the like. The modem(s) 1818 allows the wireless device 1800 to handle both voice and non-voice communications (such as communications for text messages, multimedia messages, media downloads, web browsing, etc.) with a wireless communication system. The modem(s) 1818 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 1818 may generate signals and send these signals to the antenna(s) 1826 of a first type (e.g., WLAN 5 GHZ), antenna(s) 1828 of a second type (e.g., WLAN 2.4 GHz), and/or antenna(s) 1830 of a third type (e.g., WAN), via Rf circuitry 1822, and Rf module(s) 1824 as described herein. Antenna(s) 1826, 1828, 1830 may be configured to transmit in different frequency bands and/or using different wireless communication protocols. The antenna(s) 1826, 1828, 1830 may be directional, omnidirectional, or non-directional antennas. In addition to sending data, antenna(s) 1826, 1828, 1830 may also receive data, which is sent to appropriate RF modules connected to the antennas. One of the antennas antenna(s) 1826, 1828, 1830 may be any combination of the antenna structures described herein.

In one embodiment, the wireless device 1800 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the wireless mesh network, and the second wireless connection may be associated with serving a content file to a client consumption device, as described herein.

In the above description, numerous details are set forth. It will be apparent, however, to one of ordinary skill in the art having the benefit of this disclosure that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing system comprising a memory device that stores instructions; and a processing device, operatively coupled to the memory device, that executes the instructions to perform operations comprising:

receiving a request to create a wireless local area network (WLAN) mesh network between a plurality of wireless devices of a first wireless network, wherein the plurality of wireless devices are connected to an access point (AP) device of the first wireless network over one or more wireless links each having a first bandwidth;

receiving, from each of the plurality of wireless devices:

first information about the AP device of the first wireless network to which the respective device is connected comprising (i) a device identifier of the respective wireless device; (ii) an identifier of the AP device; (iii) an identifier of a frequency band associated with the AP device; and (iv) an identifier of a channel associated with the AP device, and second information about the other wireless devices of the plurality of wireless devices comprising (i) the device identifier of the respective wireless device; (ii) a device identifier of at least one of the other wireless devices discovered in a scan by the respective device; (iii) a receive signal strength indicator (RSSI) value associated with the at least one of the other wireless devices; (iv) an identifier of a channel used by the at least one of the other wireless devices; and (v) a data rate associated with the channel;

calculating, using the first information and the second information, a channel score for each channel of a plurality of available channels for the WLAN mesh network;

sending one or more commands to each of the plurality of wireless devices to form the WLAN mesh network using a channel of the plurality of available channels having a highest channel score, wherein the WLAN mesh network comprises one or more mesh links, each mesh link having a second bandwidth higher than the first bandwidth; and receiving, from the plurality of wireless devices, channel state information (CSI) data representing channel properties of the one or more mesh links.

2. The computing system of claim 1, wherein calculating the channel score comprises:

determining a first score using a band type of the respective channel;

determining a second score using an amount of utilization of the respective channel;

determining a third score using a data rate of the one or more wireless links on the respective channel;

determining a fourth score associated with any of the plurality of wireless devices that is indirectly connected to the AP device on the respective channel; and determining the channel score by adding the first, second, and third scores and subtracting the fourth score.

3. The computing system of claim 1, wherein the second information comprises a respective receive signal strength indicator (RSSI) value associated with a mesh link between each pair of the plurality of wireless devices, wherein the operations further comprise:

calculating, for each of the one or more mesh links, a first score using the respective RSSI value;

calculating, for each of the plurality of wireless devices, a second score by summing the first scores of the one or more mesh links; and sending information to each of the plurality of wireless devices, the information identifying a first wireless device of the plurality of wireless devices as a leader of the WLAN mesh network, wherein the information causes the first wireless device to initiate the formation of the WLAN mesh network using the channel, a mesh identifier (ID), and a passphrase.

4. The computing system of claim 1, wherein the second information comprises a media access control (MAC) address of each of the plurality of wireless devices and a respective receive signal strength indicator (RSSI) value associated with a mesh link between each pair of the plurality of wireless devices, wherein the operations further comprise:

generating data representing a topology of the first wireless network;

determining, from the data, a longest path in the first wireless network;

identifying a first wireless device of the plurality of wireless devices at or near a center of the longest path; and sending information to each of the plurality of wireless devices, the information identifying the first wireless device as a leader of the WLAN mesh network, wherein the information causes the first wireless device to initiate the formation of the WLAN mesh network using the channel, a mesh identifier (ID), and a passphrase.

5. The computing system of claim 1, wherein the second bandwidth is greater than 40 MHz.

6. A method comprising:

receiving a request to create a wireless local area network (WLAN) mesh network between a plurality of wireless devices of a first wireless network, wherein the plurality of wireless devices are connected to an access point (AP) device of the first wireless network over one or more wireless links each having a first bandwidth;

receiving, from each of the plurality of wireless devices:

first information about the AP device of the first wireless network to which the respective device is connected comprising (i) a device identifier of the respective wireless device; (ii) an identifier of the AP device; (iii) an identifier of a frequency band associated with the AP device; and (iv) an identifier of a channel associated with the AP device, and second information about the other wireless devices of the plurality of wireless devices comprising (i) the device identifier of the respective wireless device; (ii) a device identifier of at least one of the other wireless devices; (iii) a receive signal strength indicator (RSSI) value associated with the at least one of the other wireless devices; (iv) an identifier of a channel used by the at least one of the other wireless devices; and (v) a data rate associated with the channel;

calculating, using the first and second information, a channel score for each channel of a plurality of available channels for the WLAN mesh network;

sending one or more commands to each of the plurality of wireless devices to form the WLAN mesh network using a channel of the plurality of available channels having a highest channel score, wherein the WLAN mesh network comprises one or more mesh links, each mesh link having a second bandwidth higher than the first bandwidth; and receiving, from the plurality of wireless devices, channel state information (CSI) data representing channel properties of the one or more mesh links.

7. The method of claim 6, wherein calculating the channel score comprises:

determining a first score using a band type of the respective channel;

determining a second score using an amount of utilization of the respective channel;

determining a third score using a data rate of the one or more wireless links on the respective channel;

determining a fourth score associated with any of the plurality of wireless devices that is indirectly connected to the AP device on the respective channel; and determining the channel score by adding the first, second, and third scores and subtracting the fourth score.

8. The method of claim 6, wherein the second information comprises a respective receive signal strength indicator (RSSI) value associated with a mesh link between each pair of the plurality of wireless devices, wherein the method further comprises:

calculating, for each of the one or more mesh links, a first score using the respective RSSI value;

calculating, for each of the plurality of wireless devices, a second score by summing the first scores of the one or more mesh links; and sending information to each of the plurality of wireless devices, the information identifying a first wireless device of the plurality of wireless devices as a leader of the WLAN mesh network.

9. The method of claim 6, wherein the second information comprises a media access control (MAC) address of each of the plurality of wireless devices and a respective receive signal strength indicator (RSSI) value associated with a mesh link between each pair of the plurality of wireless devices, wherein the method further comprises:

generating data representing a topology of the first wireless network; determining, from the data, a longest path in the first wireless network;

identifying a first wireless device of the plurality of wireless devices at or near a center of the longest path; and sending information to each of the plurality of wireless devices, the information identifying the first wireless device as a leader of the WLAN mesh network.

* * * * *